United States Patent [19]
Moribe et al.

[11] Patent Number: 5,812,501
[45] Date of Patent: *Sep. 22, 1998

[54] OPTICAL RECORDING MEDIUM HAVING A NON-VOLATILE IDENTIFICATION CODE AND METHOD FOR ENCODING DATA USING SAME

[75] Inventors: Mineo Moribe; Haruhiko Izumi; Masakazu Taguchi; Iwao Tsugawa, all of Kawasaki, Japan

[73] Assignee: Fujitsu Limited, Kawasaki, Japan

[*] Notice: The term of this patent shall not extend beyond the expiration date of Pat. No. 5,661,703.

[21] Appl. No.: 815,947

[22] Filed: Mar. 13, 1997

Related U.S. Application Data

[62] Division of Ser. No. 620,083, Mar. 21, 1996, Pat. No. 5,661,703.

[30] Foreign Application Priority Data

Jun. 27, 1995 [JP] Japan ............................ 7-161142
Oct. 3, 1995 [JP] Japan ............................ 7-256394

[51] Int. Cl.$^6$ .................................................. G11B 13/00
[52] U.S. Cl. ..................................... 369/14; 369/58
[58] Field of Search ...................... 369/14, 275.1, 369/47, 48, 54, 58; 235/454, 487, 468

[56] References Cited

U.S. PATENT DOCUMENTS

| | | |
|---|---|---|
| 4,538,059 | 8/1985 | Rudland . |
| 5,072,435 | 12/1991 | Bakx . |
| 5,291,006 | 3/1994 | Nishiguma et al. . |
| 5,300,764 | 4/1994 | Hoshino et al. . |
| 5,463,212 | 10/1995 | Oshiima et al. . |
| 5,544,137 | 8/1996 | Ohara et al. . |

FOREIGN PATENT DOCUMENTS

| | | | |
|---|---|---|---|
| 097774 | 1/1984 | European Pat. Off. ................. | 369/14 |
| 56-119991 | 9/1981 | Japan . | |
| 57-55548 | 2/1982 | Japan ...................................... | 369/14 |
| 59-71144 | 4/1984 | Japan . | |
| 60-57558 | 3/1985 | Japan ...................................... | 369/14 |
| 60-175254 | 9/1985 | Japan . | |
| 2-31356 | 2/1990 | Japan . | |
| 3-35446 | 2/1991 | Japan . | |
| 5-257816 | 10/1993 | Japan . | |
| 5-266576 | 10/1993 | Japan . | |
| 5-290420 | 11/1993 | Japan . | |
| 6-223278 | 9/1994 | Japan . | |

*Primary Examiner*—Tan Dinh
*Attorney, Agent, or Firm*—Greer, Burns & Crain, Ltd.

[57] ABSTRACT

An optical recording medium in which a medium identification code is recorded as a nonvolatile mark which is formed through irreversible change of a recording film, such as magnetization characteristic change, deformation and formation of a hole, so as to prevent illegal copying of the optical recording medium, and a recording/reproducing method for the same.

8 Claims, 26 Drawing Sheets

(41 dB)

(46 dB)

NONVOLATILE MARK

ERASING LIGHT BEAM POWER   5 mW
LINER VELOCITY              9 m/s

ERASING LIGHT BEAM POWER   5 mW
LINER VELOCITY             9 m/s

OPTICAL RECORDING MEDIUM HAVING A NON-VOLATILE IDENTIFICATION CODE AND METHOD FOR ENCODING DATA USING SAME

This is a continuation of application Ser. No. 08/620,083 filed on Mar. 21, 1996 and now is U.S. Pat. No. 5,661,703.

BACKGROUND OF THE INVENTION

1. Field of the Invention

The present invention relates to a recording method and a reproducing method for an optical recording medium in which nonvolatile data as well as rewritable data can be recorded. Furthermore, the invention relates to an optical recording medium such as a magneto-optical recording medium and a phase-change type recording medium in which information recorded therein can be managed by using nonvolatile data.

2. Description of Related Art

Various kinds of optical disks are now being used including a ROM optical disk such as a CD-ROM, a write-once optical disk in which an additional data is writable only once, and a rewritable magneto-optical disk. Such optical disks have been studied as core recording media in rapidly developing multi-media.

FIGS. 1 and 2 illustrate the principles of erasing and recording operations for a rewritable magneto-optical disk. As is shown in FIG. 1, a light beam irradiates a recording film 2 via an object lens 1, so as to heat the recording film 2 up to a temperature exceeding its Curie temperature. In cooling the recording film 2, the magnetization direction in the recording film 2 is aligned in accordance with an external magnetic field applied by a magnet 3, thereby erasing the recorded data. Furthermore, the direction of the external magnetic field applied by the magnet 3 is reversed as is shown in FIG. 2, and then a portion of the recording film 2 where the data is erased is selectively irradiated with a light beam via the object lens 1, thereby forming an area where the magnetization direction is reversed in accordance with a recorded data (i.e., forming a recording mark). Thus, data can be recorded on the magneto-optical disk.

FIG. 3 is a diagram showing an exemplified configuration of an optical head used for such a magneto-optical disk. A magneto-optical disk 10 comprises a transparent substrate 11 and a recording film 2. A reference numeral 20 denotes a laser diode for emitting a light beam. On the light beam emitting side of the laser diode 20 are disposed, in this order, a collimate lens 21 for collimating a light beam emitted by the laser diode 20, a circular compensating prism 22 for making circular the section of the light beam from the collimated lens 21, a light beam splitter 23 for transmitting or reflecting the light beam, and an object lens 1 whose position is controlled by an actuator 24.

On the reflecting side of the light beam splitter 23 are disposed, in this order, a light beam splitter 25 for transmitting and reflecting an incident light beam, a half-wave plate 26 for rotating the deflection plane of an incident light beam, and a polarization light beam splitter 27 for separating an incident light beam into horizontal and vertical components. On the light beam exiting side of the polarization light beam splitter 27 are disposed photodetectors 28 and 29 for detecting the horizontal and vertical components of the light beam having passed through the polarization light beam splitter 27. The photodetectors 28 and 29 are connected to an amplifier 30 for amplifying a sum of detection signals of the photodetectors 28 and 29 and an amplifier 31 for amplifying a difference between the detection signals of the photodetectors 28 and 29. On the reflecting side of the light beam splitter 25 are disposed, in this order, a collective lens 32 for collecting an incident light beam, a cylindrical lens 33 and a quarter photodetector 34 for detecting the intensity of an incident light beam. The half-wave plate 26, the polarization light beam splitter 27 and the photodetectors 28 and 29 together form a magneto-optical signal detection system for detecting the change of the polarizing angle of an incident light beam caused by the magnetic Kerr effect due to a difference in the magnetization direction on the recording film 2. The collective lens 32, the cylindrical lens 33 and the quarter photodetector 34 together form a spot control signal detection system for focusing and tracking control of a light beam spot on the recording film 2.

A light beam emitted by the laser diode 20 is collimated by the collimate lens 21, and the collimated light beam is allowed to have a circular section by the circular compensating prism 22. Then, the resultant light beam is converged on the recording film 2 of the magneto-optical disk 10 via the object lens 1. A light beam reflected by the recording film 2 is reflected by the light beam splitter 23, and divided by the light beam splitter 25 into two directions respectively directed to the magneto-optical signal detection system and the spot control signal detection system.

In the magneto-optical signal detection system, the half-wave plate 26 makes the polarizing angle of the reflected light beam approximately 45° against the polarization light beam splitter 27, so as to separate the light beam into the horizontal and vertical components by the polarization light beam splitter 27. The horizontal and vertical components are respectively converted into electric signals by the photodetectors 28 and 29. Based on a difference between the electric signals (obtained by the amplifier 31), a magneto-optical reproducing waveform which is reversed in accordance with the magnetization direction on the recording film 2 can be obtained. Furthermore, based on a sum of the electric signals (obtained by the amplifier 30), a signal corresponding to the change of the reflected light beam quantity is obtained, so as to reproduce a pre-format signal which is recorded on the magneto-optical disk 10 in the form of a pit. In the spot control signal detection system, based on a detection signal of the quarter photodetector 34, a focus error signal is obtained by using, for example, a known astigmatism method, and a tracking error signal is obtained by using, for example, a known push-pull method. Then, focusing and tracking of a spot is controlled based on these error signals.

Although a read-only data can be recorded in a pre-format portion of such a conventional magneto-optical disk, a write-once recording operation of a nonvolatile data cannot be conducted because data recorded in a general magneto-optical recording portion can be rewritten on principle.

Now, various known techniques for recording a nonvolatile data in a magneto-optical disk will be described. Japanese Patent Application Laid-Open No. 3-35446 (1991) discloses a magneto-optical disk comprising a recording layer used for a write-once recording operation as well as a recording layer used for a reversible recording operation. An irreversible write-once recording operation is conducted through irradiation with a light beam having a higher intensity than that used for a general recording operation, and the irreversibly recorded data is reproduced in accordance with the change of the reflected light beam quantity. Such a magneto-optical disk is required to have the additional recording layer for the write-once recording operation, and hence, a commercially available magneto-optical disk cannot be used for the write-once recording operation of a nonvolatile data.

Japanese Patent Application Laid-Open No. 59-71144 (1984) discloses a magneto-optical disk whose recording area is previously divided into a reversible recording area and an irreversible recording area (namely, the magneto-optical disk comprises a recording layer for the write-once recording operation similarly to the above-mentioned known technique), so as to selectively perform a rewritable recording operation and a nonvolatile recording operation. This magneto-optical disk has the same disadvantage as that of the aforementioned conventional technique, and additionally, the amount of nonvolatile data to be recorded is disadvantageously limited because the recording area is previously divided into the reversible and irreversible recording areas.

Japanese Patent Application Laid-Open Nos. 2-31356 (1990) and 56-119991 (1981) disclose a recording/reproducing apparatus which conducts an irreversible recording operation through crystallization of an amorphous magnetic film and a reproducing operation on the basis of the change of light quantity utilizing the change of a reflectance. When a data recorded in a user data area of a general magneto-optical disk is to be reproduced, an ID signal in a pre-format area is first read on the basis of the change of the light quantity, and the data in the user data area is subsequently read on the basis of the change of the polarizing angle. According to these conventional techniques, when a nonvolatile data is recorded in part of the user data area, a reproducing operation for an irreversibly recorded data in the user data area is different from that for a reversibly recorded data. Therefore, it is necessary to previously determine which part of the user data area is used as the irreversible recording area. As a result, the format of the disk becomes different from that of a general disk, and the recording/reproducing operation of the recording/reproducing apparatus is to be partly changed. In addition, the irreversible recording area is restricted by the disk format, and hence, it is difficult for a user to change the size of the area.

Japanese Patent Application Laid-Open No. 5-290420 (1993) discloses a magneto-optical disk in which the direction of an axis of easy magnetization of the magneto-optical medium is changed from the vertical direction to the horizontal direction through irradiation with a light beam having a high power, so as to record a read-only signal utilizing the Kerr effect. The present inventors, however, have found through experiments that a reversed magnetization area is formed around a nonvolatile mark merely through the irradiation with a light beam having a high power, and that a reproducing signal cannot be obtained in the presence of such a reversed magnetization area.

The Applicant discloses, in Japanese Patent Application No. 6-223278 (1994), a method for forming a nonvolatile mark by irradiating a medium with a light beam having a higher power and/or rotating the medium at a smaller peripheral velocity than in the general recording operation. Also, it is found and described that a reversed magnetization area formed around the nonvolatile mark can be erased after the formation of the nonvolatile mark by a general erasing operation and that the nonvolatile mark can be reproduced by a general magneto-optical recording/reproducing method.

On the other hand, an optical recording medium has been widely acknowledged and spread as an external memory for a data processor such as a computer. This causes more and more risk of dishonest and illegal usage of a program and a data by copying them on another recording medium. A recording medium free from such illegal copy is described in Japanese Patent Application Laid-Open Nos. 60-175254 (1985) and 5-266576 (1993). Japanese Patent Application Laid-Open No. 60-175254 (1985) discloses a recording medium in which a defect as a label of a genuine product (hereinafter referred to as a medium identification code) is formed at a predetermined position. Only when the defect can be detected in a reproducing operation, a program recorded therein can be executed and a data recorded therein can be reproduced.

The recording medium disclosed in Japanese Patent Application Laid-Open No. 5-266576 (1993) includes a defect as the medium identification code formed in a predetermined sector, and the sector is recorded in an address table. When the sector including the defect is detected in a reproducing operation, the address table is referred to so as to determine whether the medium is a genuine product or a copy. In the case of illegal copy of a recording medium as described above, the copied program and data cannot be used. This prevents illegal copy of a recording medium, and a right to a program and a data therein can be protected.

However, in the aforementioned recording media, a defect on the recording media is detected as the medium identification code. Therefore, when a defect is accidentally formed on a recording medium, error detection can be caused. In such a case, a program cannot be executed and a data cannot be reproduced even though the recording medium is a genuine product. Furthermore, when the position of the defect is identified, a program and a data in a copied medium can be used by forming a defect at that position in the copied medium. In addition, when a defect is formed by providing a flaw on the surface of a medium, a recording film is exposed to air at the defect, so that the recording film can be oxidized and corroded. In such a case, recorded information can be eventually destroyed. Therefore, the reliability of the recording medium can be largely decreased.

SUMMARY OF THE INVENTION

The present invention was devised to overcome the aforementioned problems. One object of the invention is further developing the magneto-optical recording/reproducing method disclosed in the aforementioned Japanese Patent Application No. 6-223278 (1994), so as to provide a magneto-optical recording medium in which a nonvolatile mark can be easily reproduced and a phase-change type optical recording medium comprising a recording film having a different 1O reflectance in accordance with a phase state thereof; providing an optical recording medium in which a medium identification code is recorded as a nonvolatile mark, so as to prevent illegal copy thereof without degrading the reliability thereof; and providing a recording/reproducing method for such recording media.

The optical recording medium of this invention comprises a substrate and a recording film formed on the substrate, in which a recording mark, having a magnetization direction corresponding to data to be recorded, is able to be formed through light beam irradiation which is moved relatively with the recording film and application of an external magnetic field. In this optical recording medium, a nonvolatile mark is formed in the recording film by irreversibly changing a magnetization characteristic of the recording film under application of an external magnetic field in a direction for erasing the recording mark by moving the optical recording medium at a velocity lower than that used for forming the recording mark and/or irradiating the optical recording medium with a light beam stronger than that used for forming the recording mark.

Accordingly, in the nonvolatile mark formed by changing the magnetization characteristic of part of the recording film, the magnetic Kerr effect has been lost and the change of the polarizing angle detected in a reproducing operation is substantially zero. As a result, the nonvolatile mark can be reproduced with a general reproducing apparatus. Thus, the optical recording medium also has a write-once type nonvolatile data recording function.

Alternatively, the optical recording medium of this invention comprises a substrate, and a recording film formed on the substrate on which a recording mark, corresponding to data to be recorded, is able to be formed, and a medium identification code is recorded on the recording film as a nonvolatile mark formed by irreversibly changing the recording film.

Furthermore, in the optical recording medium of the invention, a medium identification code is recorded as a nonvolatile mark formed by irreversibly changing the recording film, under application of an external magnetic field in a direction for erasing the recording mark, by moving the optical recording medium at a velocity lower than that used for forming the recording mark and/or irradiating the optical recording medium with a light beam stronger than that used for forming the recording mark.

Alternatively, the optical recording medium of this invention comprises a substrate, and a recording film formed on the substrate in which a recording mark, having a magnetization direction corresponding to data to be recorded is able to be formed through light beam irradiation and application of an external magnetic field. In this optical recording medium, a medium identification code is recorded as a nonvolatile mark formed by irreversibly changing a magnetization characteristic of the recording film.

Accordingly, the medium identification code recorded as such a nonvolatile mark cannot be erased through an erasing operation. However, a medium identification code having been illegally copied is erased through an erasing operation, and hence cannot be reproduced.

Furthermore, in the optical recording medium of this invention, a recording program is recorded. The recording program includes steps of reproducing the medium identification code, encoding data based on the reproduced medium identification code and recording the encoded data.

Therefore, since recorded data is encoded based on the medium identification code, security of the data can be improved.

Furthermore, in the optical recording medium of this invention, a reproducing program is recorded. The reproducing program includes steps of conducting an erasing operation for erasing a recording mark on an area where the medium identification code is recorded, reproducing the medium identification code after the erasing operation, reproducing the recorded data, and decoding the reproduced data based on the reproduced medium identification code.

Accordingly, by activating the reproducing program, a medium identification code in an illegally copied optical recording medium is erased. Thus, an illegally copied optical recording medium cannot be used.

Additionally, in the optical recording medium of this invention, an encoded data encoded based on the medium identification code is recorded.

In one aspect of the invention, the encoded data is recorded as a read-only data.

In another aspect of the invention, the encoded data is recorded as a rewritable data.

Therefore, when the encoded data is recorded as a read-only data, the optical recording medium can be mass-produced at a low cost. When the encoded data is recorded as a rewritable data, the data can be changed through addition and modification.

Furthermore, in the optical recording medium of the invention, the medium identification code is recorded in a plurality of portions of the recording film.

Therefore, for example, by recording a plurality of medium identification codes in one sector or in a plurality of sectors, a time period until the medium becomes unreproducible due to exhaustion of the medium identification code resulting from repeated reproducing operations can be extended. In addition, it is possible to obtain reproducing signals of a plurality of medium identification codes without conducting error correction in reproducing the medium identification code, so as to determine a correct medium identification codes through a majority operation on the reproducing signals. Furthermore, at least one of the medium identification codes is selected so as not to be reproduced until the other medium identification codes become unreproducible. Thus, the optical recording medium is prevented from becoming unusable because the medium identification code is unreproducible.

Furthermore, in the optical recording medium of this invention, one nonvolatile mark or one medium identification code is formed in each of an odd number of adjacent track areas.

Therefore, by reproducing the nonvolatile mark recorded in the center track area among these adjacent track areas, the amplitude of a reproducing signal is increased as compared with the case where the nonvolatile mark is recorded merely in one track area.

Alternatively, in the optical recording medium of this invention, one nonvolatile mark or one medium identification code is formed in one track area and two groove areas sandwiching the track area.

Therefore, by reproducing the nonvolatile mark in the track area sandwiched between the groove areas, the amplitude of a reproducing signal is increased as compared with the case where the nonvolatile mark is recorded merely in one track area.

Other objects of the invention are providing a recording/reproducing method for an optical recording medium capable of a nonvolatile write-once recording operation by using a general optical recording medium; providing a recording/reproducing method for an optical recording medium in which a range of a recording area for a nonvolatile mark can be optionally set; and providing a recording/reproducing method for an optical recording medium which can reproduce a rewritable data and a nonvolatile mark through a general operation of a recording/reproducing apparatus.

The recording method for an optical recording medium of this invention comprises the steps of applying an external magnetic field in a direction for erasing a recording mark to a recording film; and forming a nonvolatile mark by irreversibly changing a magnetization characteristic of the recording film by moving the optical recording medium at a velocity lower than that used for forming the recording mark and/or irradiating the optical recording medium with a light beam stronger than that used for forming the recording mark.

Accordingly, in the nonvolatile mark formed by changing the magnetization characteristic of the recording film, the magnetic Kerr effect has been lost and the change of the polarizing angle detected in a reproducing operation is substantially zero. Therefore, a nonvolatile mark can be reproduced with a general reproducing apparatus, and a write-once type nonvolatile data recording function is also provided.

Furthermore, the reproducing method for an optical recording medium of this invention comprises the steps of is irradiating an area of a recording film where a nonvolatile mark is formed with a light beam; and detecting light reflected by the recording film, so as to reproduce data recorded by using the nonvolatile mark from a magneto-optical reproducing waveform output.

Therefore, a nonvolatile mark can be reproduced with a general apparatus, and a write-once type nonvolatile data recording function is also provided.

Alternatively, the recording method for an optical recording medium of this invention comprises the steps of reproducing a medium identification code recorded as a nonvolatile mark formed through irreversible change, encoding a data based on the reproduced medium identification code, and recording the encoded data.

Therefore, since recorded data is encoded based on the medium identification code, the security of the data is improved.

Furthermore, the reproducing method for an optical recording medium of this invention comprises the steps of conducting an erasing operation for erasing a recording mark on an area where a medium identification code is recorded as a nonvolatile mark formed through irreversible change, reproducing the medium identification code after the erasing operation, reproducing recorded data, and decoding the reproduced data based on the reproduced medium identification code.

Therefore, by activating the reproducing program, a medium identification code in an illegally copied optical recording medium is erased. Thus, an illegally copied optical recording medium cannot be used.

Furthermore, the reproducing method for an optical recording medium of this invention comprises the steps of reproducing a plurality of the same medium identification codes recorded as nonvolatile marks formed through irreversible change without conducting error correction generally conducted in a reproducing operation, so as to obtain a plurality of reproducing codes; and conducting a majority operation on these reproducing codes, so as to select one reproducing code as a correct medium identification code.

Therefore, through the majority operation on the obtained reproducing signals of the plural medium identification codes, a correct medium identification code can be determined.

Furthermore, the reproducing method for an optical recording medium of this invention comprises the steps of reproducing a plurality of the same medium identification codes recorded using by the nonvolatile marks formed through irreversible change excluding at least one predetermined medium identification code; and reproducing the predetermined medium identification code when the remaining medium identification codes are unreproducible.

Therefore, the optical recording medium is prevented from becoming unusable due to the medium identification code being unreproducible.

Furthermore, the reproducing method for an optical recording medium of this invention comprises the steps of detecting a plurality of the same nonvolatile marks formed through irreversible change or a plurality of the same medium identification codes recorded by using the nonvolatile marks being recorded in each of an odd number of adjacent tracking areas on a recording film; and reproducing the medium identification code formed in the center track area.

Therefore, by reproducing the center nonvolatile mark, the amplitude of a reproducing signal is increased as compared with the case where the nonvolatile mark is recorded merely in one track area.

Furthermore, the reproducing method for an optical recording medium of this invention comprises the steps of detecting a plurality of the same nonvolatile marks formed through irreversible change or a plurality of the same medium identification codes recorded by using the nonvolatile marks being recorded in one tracking area and two groove areas sandwiching the track area on a recording film; and reproducing the medium identification code formed in the track area sandwiched between the groove areas.

Therefore, by reproducing the nonvolatile mark formed in the track area sandwiched between the groove areas, the amplitude of a reproducing signal is increased as compared with the case where the nonvolatile mark is recorded merely in one track area.

The above and further objects and features of the invention will more fully be apparent from the following detailed description with accompanying drawings.

DETAILED DESCRIPTION OF THE INVENTION

Figure 1:
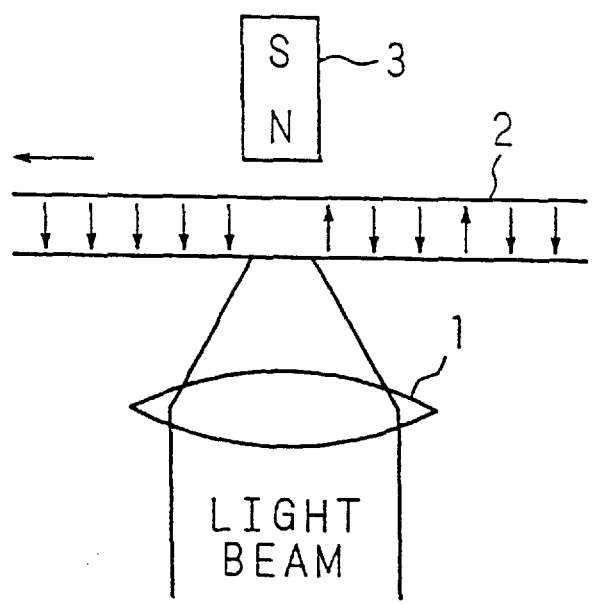
FIG. 1 illustrates the principle of an erasing operation in a general magneto-optical disk.
Figure 2:
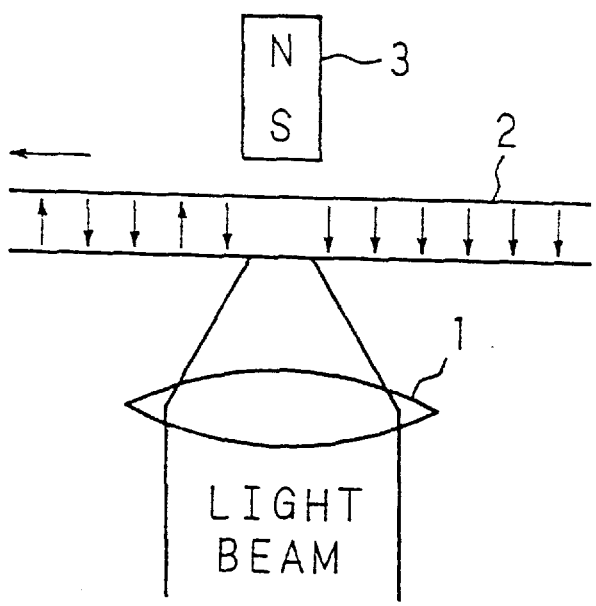
FIG. 2 illustrates the principle of a recording operation in a general magneto-optical disk.

The present invention will now be described referring to the drawings illustrating the embodiments thereof.

As a first embodiment of the invention, recording conditions for a nonvolatile mark will be described. A magneto-optical disk used in this embodiment comprises a polycarbonate substrate on which a pre-format signal and tracking grooves are transferred, and a SiN protection film, a DyFeCo amorphous alloy recording film, another SiN protection film, an Al reflecting film and a resin coating layer laminated on the substrate in this order. A general rewritable recording mark is formed on this magneto-optical disk under conditions of a peripheral velocity of 10 m/sec., a recording/erasing light beam power of 10.5 mW and an external magnetic field of ±300 Oe (wherein −300 Oe indicates a magnetic field in the erasing direction). A nonvolatile mark is recorded on this magneto-optical disk at a lower peripheral velocity with a stronger light beam power than in the recording operation for a general rewritable data.

Figure 4:
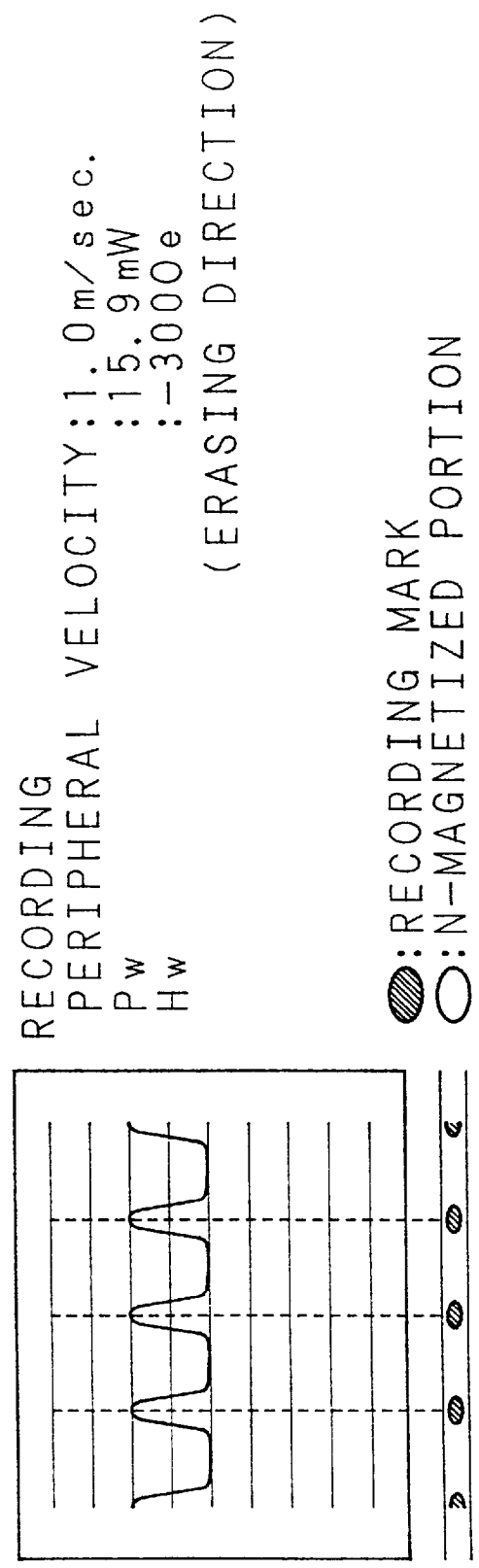
FIG. 4 is a diagram showing a reproducing waveform of a nonvolatile mark according to a first embodiment of the invention.

Specifically, under conditions of a peripheral velocity of 1.0 m/sec., a writing light beam power (Pw) of 15.9 mW and an external magnetic field in the erasing direction of −300 Oe, an 8T signal (wherein T indicates a clock period) having been code modulated with (2,7)RLL is position-recorded at a recording density of 0.78 μm/mark. Then, a reproducing operation is conducted at a peripheral velocity of 9.0 m/sec. and a reading light beam power (Pr) of 1.0 mW. FIG. 4 shows a reproducing waveform of a nonvolatile mark of this embodiment, wherein the reproducing waveform obtained in the above mentioned reproducing operation is shown together with a recording track pattern. As is shown in FIG. 4, on the recording track is formed an area (a hatched area; i.e., a nonvolatile mark) where the magnetization characteristic has been changed (specifically, the vertical anisotropy has been lost so as to eliminate the Kerr effect), and the reproducing waveform has its peak corresponding to the nonvolatile mark.

Even after an erasing operation is conducted on this recording track under conditions of a peripheral velocity of 9.0 m/sec., an erasing light beam power (Pe) of 10.5 mW and an erasing magnetic field of −300 Oe, the reproducing waveform obtained through a reproducing operation at a peripheral velocity of 9.0 m/sec. and a reading light beam power (Pr) of 1.0 mW is identical to that shown in FIG. 4. Thus, a nonvolatile mark is found to have been formed.

Figure 5:
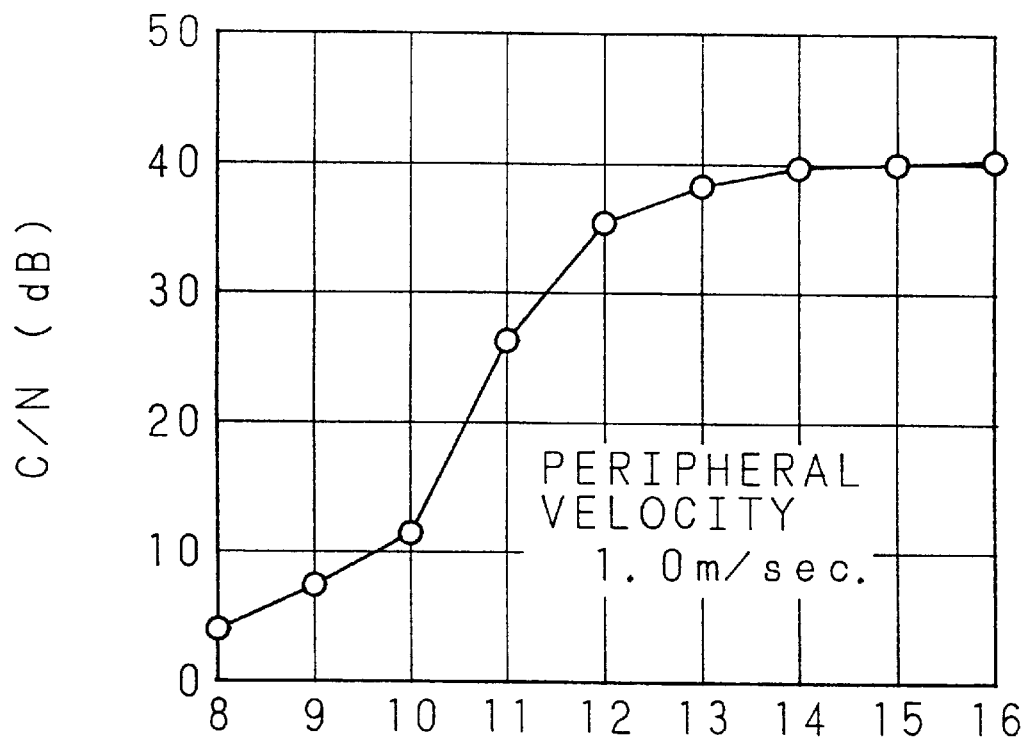
FIG. 5 is a graph showing the relationship between a writing light beam power and C/N of a reproducing waveform obtained by a recording method of the invention.

It has been found that the formation of a nonvolatile mark depends upon the magnitude of irradiation energy, and that the peripheral velocity of a magneto-optical medium and a writing light beam power are concerned with the formation of a nonvolatile mark. FIG. 5 is a graph showing the relationship between C/N of the reproducing waveform of the magneto-optical disk of this embodiment and a writing light beam power, obtained when a nonvolatile mark is recorded at a peripheral velocity of 1.0 m/sec. In this graph, the ordinate indicates the C/N (dB) corresponding to the quality of a signal, and the abscissa indicates a writing light beam power Pw (mW). As is understood from this graph, the C/N is sufficiently large, i.e., 30 dB or more, when a nonvolatile mark is recorded with a writing light beam power (Pw) of 12 mW or more.

As is obvious from the graph shown in FIG. 5, when the peripheral velocity of the magneto-optical medium is 1.0 m/sec., a nonvolatile mark can be recorded through a recording operation with a writing light beam power (Pw) of 12 mW or more. When the peripheral velocity of the magneto-optical medium is 9.0 m/sec., a nonvolatile mark cannot be formed with a writing light beam power (Pw) of 15.9 mW or less. Also, it has been found that a nonvolatile mark which can be reproduced with sufficient C/N can be recorded with a lower writing light beam power when the peripheral velocity of the magneto-optical medium is lower.

Figure 3:
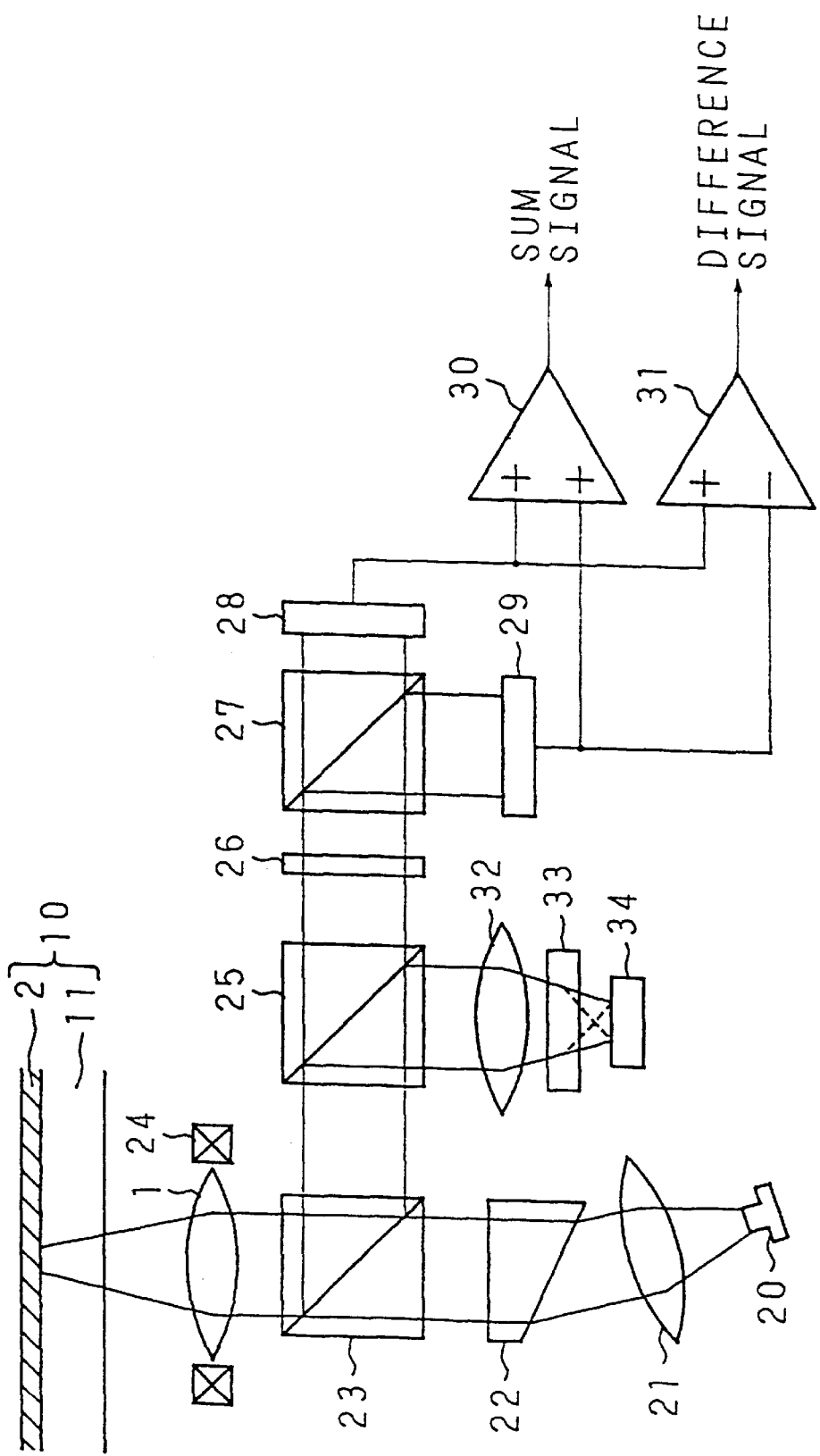
FIG. 3 is a diagram showing the configuration of a general optical head.
Figure 6:
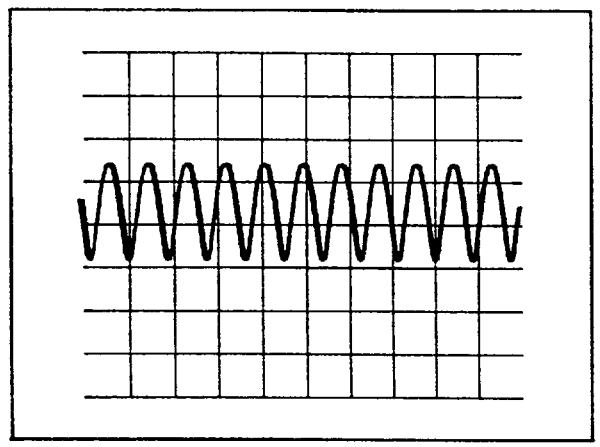
FIG. 6 is a diagram showing a reproducing waveform of a nonvolatile mark according to the invention.
Figure 7:
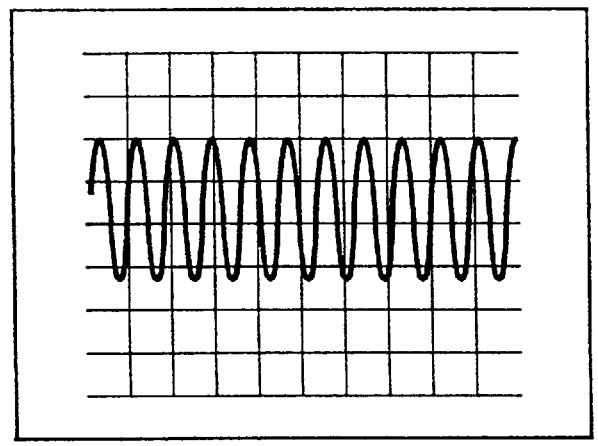
FIG. 7 is a diagram showing a reproducing waveform of a general recording mark.

Furthermore, a 3T signal having been code modulated with (2,7)RLL is position-recorded at a recording density of 0.78 μm/mark under conditions of a peripheral velocity of 1.0 m/sec., a writing light beam power (Pw) of 15.9 mW and an external magnetic field in the erasing direction of −300 Oe. Then, a reproducing operation is conducted at a peripheral velocity of 9.0 m/sec. and a reading light beam power (Pr) of 1.0 mW. As a comparative example, a similar 3T signal is position-recorded at a recording density of 0.78 μm/mark under the general conditions (a peripheral velocity of 9.0 m/sec., a writing light beam power of 10.5 mW), and is reproduced at a peripheral velocity of 9.0 m/sec. and a reading light beam power (Pr) of 1.0 mW. FIGS. 6 and 7 show reproducing waveforms obtained from data of these media. The C/N of the nonvolatile mark of this embodiment is 41 dB, while that of the comparative example is 46 dB. However, the C/N of this embodiment is sufficiently high for a general reproducing operation, and this C/N can provide a reproducing signal on the basis of a difference output from the photodetectors 28 and 29 (shown in FIG. 3) as in the general magneto-optical reproducing operation.

Figure 8:
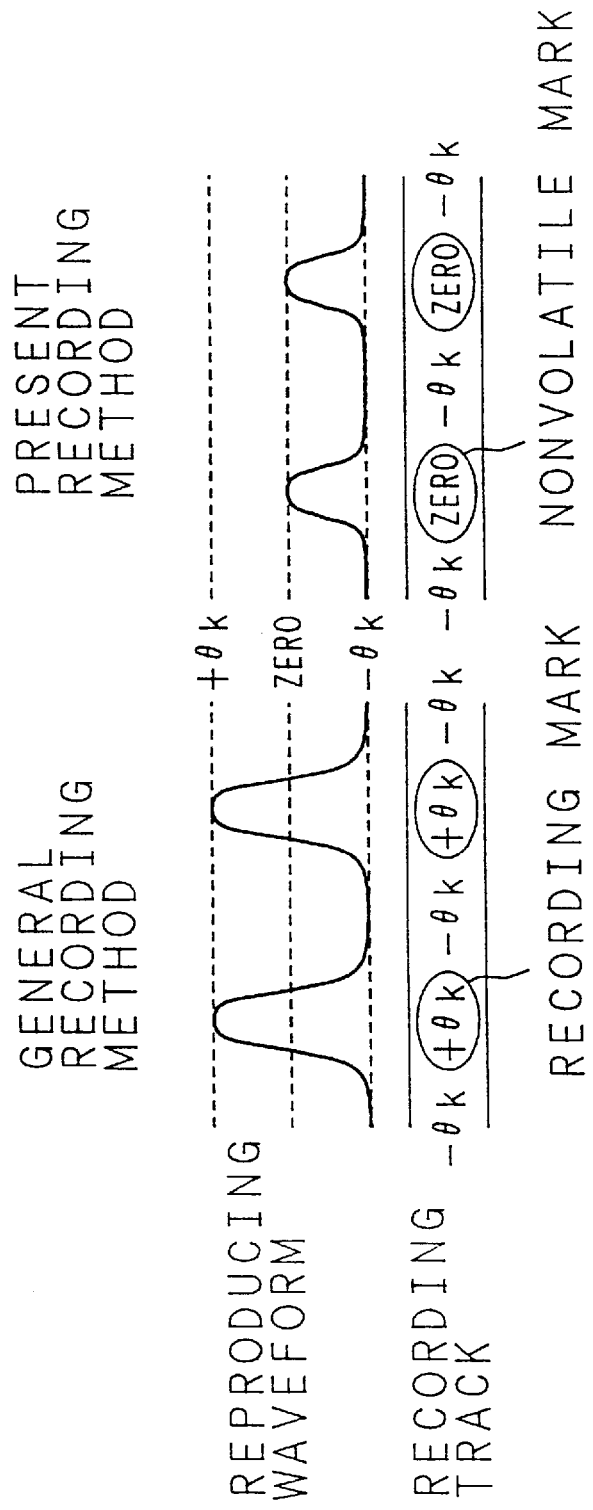
FIG. 8 is a diagram showing reproducing waveforms obtained by the recording method of this invention and a general magneto-optical recording method.

The above described C/N difference between the reproducing signal of the data recorded in the general magneto-optical recording operation and the reproducing signal of the nonvolatile mark recorded by the recording method of this embodiment is caused by a difference in the amplitude of the reproducing signals. FIG. 8 shows the nonvolatile mark formed by the present recording method and the reproducing waveform together with those obtained by the general recording method. The amplitude of the reproducing signal of the nonvolatile mark recorded by the present method is a half of that of the general reproducing signal. This difference is assumed to be caused for the following reason: In the general recording mark, the polarizing angle becomes +θk or −θk in accordance with the upward or downward direction of the magnetization, while the change of the polarizing angle in the nonvolatile mark of this embodiment is substantially zero because the magnetic Kerr effect has been lost.

Furthermore, when a portion recorded by the present method is reproduced with a light quantity change signal, a reproducing signal can be scarcely obtained. This reveals that the recording film is not crystallized by the present recording method. Accordingly, in a nonvolatile mark recorded by the present method, the structure (crystal or amorphous) of the recording film is not changed but the magnetization characteristic of the recording film is changed. Specifically, the vertical anisotropy of the mark on the recording film becomes small, and the change of the polarizing angle due to the magnetic Kerr effect caused by the vertical magnetization is substantially zero.

Although DyFeCo is used for the recording film in the aforementioned embodiment, the material for the recording film is not limited to DyFeCo but it can be a TbFeCo film or a double layer of GdFeCo/TbFeCo, and any vertical magnetization recording film can exhibit the same effect.

Figure 9:
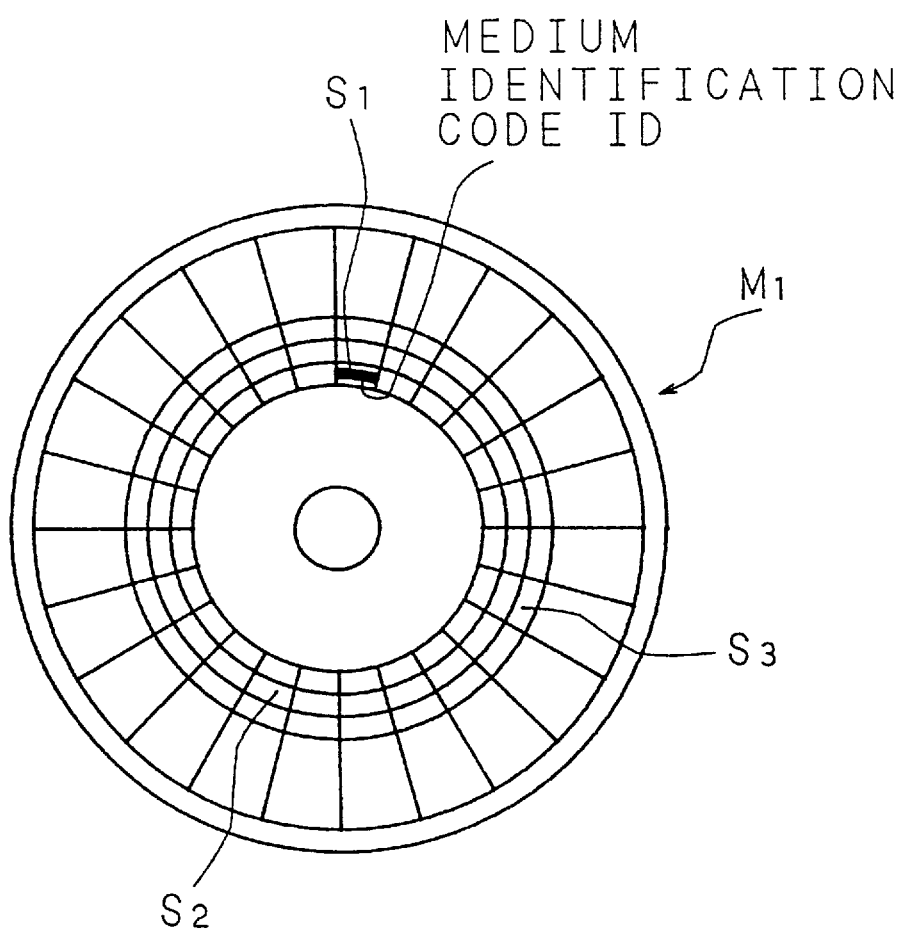
FIG. 9 is a schematic plane view showing the configuration of a magneto-optical disk of a second embodiment of the invention.
Figure 10:
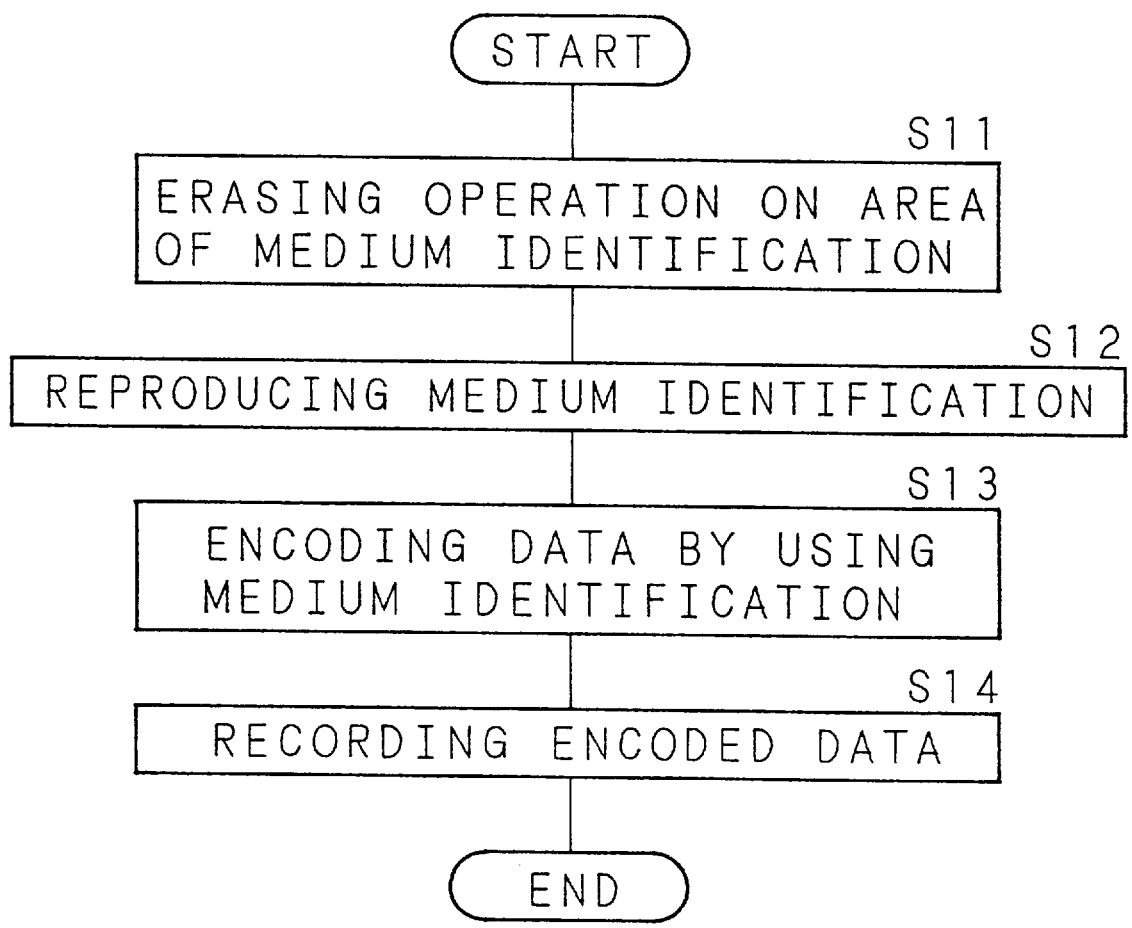
FIG. 10 is a flow chart for showing the recording procedures for the magneto-optical disk of the second embodiment.
Figure 11:
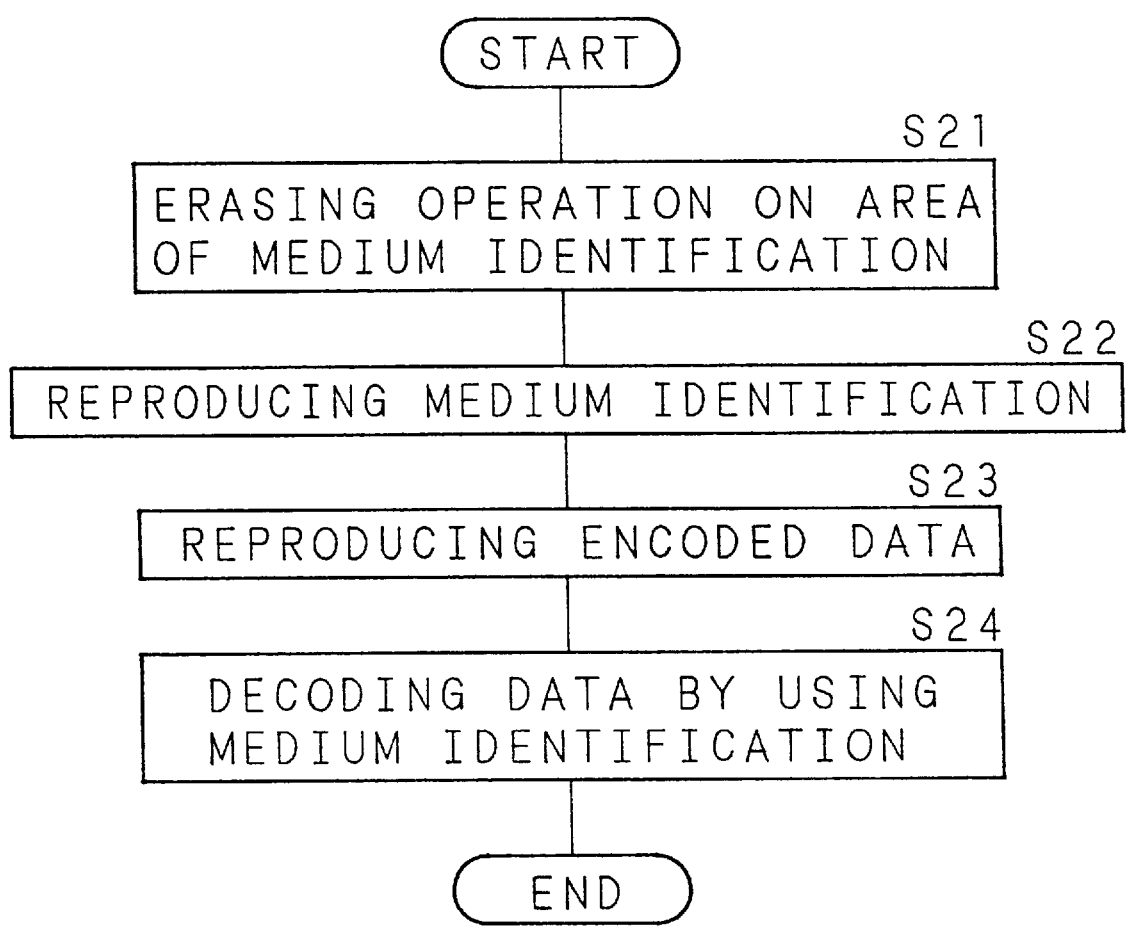
FIG. 11 is a flow chart for showing the reproducing procedures for the magneto-optical disk of the second embodiment.

Now, a second embodiment of the invention will be described referring to the accompanying drawings. FIG. 9 is a schematic plane view of a magneto-optical disk of this embodiment. This magneto-optical disk $M_1$ comprises a DyFeCo recording film. A medium identification code ID, which is a code inherent to each medium, is recorded as a nonvolatile mark in a first area $S_1$ (a sector) of the magneto-optical disk $M_1$ under the conditions described in the first embodiment. In a second area $S_2$ is recorded a recording/reproducing program for recording and reproducing a data in and from the medium by a general magneto-optical recording method. FIGS. 10 and 11 are flow charts showing recording and reproducing procedures for the magneto-optical disk $M_1$ in accordance with this program. The recording/reproducing method for the magneto-optical disk $M_1$ will now be described referring to these flow charts.

When a data is to be recorded on the magneto-optical disk $M_1$, an erasing operation is conducted on the area $S_1$ where the medium identification code ID is recorded (step S11), and then the medium identification code ID recorded in the area $S_1$ is reproduced (step S12). By using the reproduced medium identification code ID, the data to be recorded is encoded (step S13), and the encoded data is recorded in a third area $S_3$ (step S14).

When a recorded data is to be reproduced from the magneto-optical disk $M_1$, an erasing operation is conducted on the area $S_1$ where the medium identification code ID is recorded (step S21), and then the medium identification code ID recorded in the area $S_1$ is reproduced (step S22). Then, the data is reproduced in an encoded state (step S23), and the encoded data is decoded by using the reproduced medium identification code ID (step S24).

The Applicant has proposed, in Japanese Patent Application Laid-Open No. 5-257816 (1993), a method for protecting an electronic data by using a medium identification code. This publication describes a method in which a medium inherent key is generated on the basis of a medium identification code recorded on the medium and a data to be recorded is encoded by using the medium inherent key, so as to record the encoded data in the medium, and a method for reproducing the data recorded in the above-described manner and decoding the data by using the medium inherent key. The encoding and decoding procedures in this embodiment are performed in accordance with the methods described in Japanese Patent Application Laid-Open No. 5-257816 (1993), and the description is herein omitted.

For example, the case where the magneto-optical disk $M_1$ including the aforementioned recording/reproducing program is illegally copied onto another medium will now be described. A magneto-optical disk $m_1$ contains copied contents of the magneto-optical disk $M_1$. When a data is to be reproduced from the magneto-optical disk $m_1$, an erasing operation is conducted on the area $S_1$ where the medium identification code ID is recorded in step S21. However, since the medium identification code ID copied on the magneto-optical disk $m_1$ is recorded as a recording mark formed by the general magneto-optical recording method, this medium identification code ID is erased in the erasing operation in step S21. Therefore, even when a data is reproduced in step S23, the data cannot be decoded (in step S24). Thus, a data cannot be reproduced from the magneto-optical disk $m_1$. In this manner, illegal copy of the magneto-optical disk $M_1$ can be prevented. Also, when a data is to be recorded on the magneto-optical disk $m_1$, the medium identification code ID is similarly erased in step $S_1$, and the data cannot be encoded (in step S13). Thus, a data cannot be recorded on the magneto-optical disk $m_1$. In this manner, a data can be recorded merely in a specific medium having the medium identification code, i.e., the magneto-optical disk $M_1$ in this embodiment, and a data can be prevented from being recorded in another medium.

In this embodiment, the data recording in the magneto-optical disk $m_1$ is inhibited, but the data recording can be made possible. This is because a recorded data cannot be used anyway since it cannot be reproduced. Therefore, when a data is to be recorded in the magneto-optical disk $m_1$, it is possible to arrange that the medium identification code ID recorded in the area $S_1$ can be reproduced (in step S12) without performing an erasing operation on the area $S_1$ where the medium identification code ID is recorded (i.e., step S11 shown in FIG. 10 can be omitted).

Furthermore, even when the contents (encoded data) of the magneto-optical disk $M_1$ is copied onto a magneto-optical disk in which a medium identification code ID is recorded by the present recording method, the encoded data can be prevented from being decoded by making the medium identification code inherent to each medium. Thus, illegal copy onto another magneto-optical disk can be prevented.

In addition, there is no need to separately provide a recording layer for a write-once recording operation to the magneto-optical disk $M_1$ of this embodiment. Therefore, a nonvolatile write-once recording operation can be conducted in addition to the general magneto-optical recording operation by using a general magneto-optical medium.

Furthermore, a nonvolatile mark is recorded in the magneto-optical disk $M_1$ merely by varying the peripheral velocity and the light beam power. Therefore, the recording/reproducing procedures are identical to the general magneto-optical recording/reproducing procedures. Thus, a nonvolatile mark can be recorded and reproduced in an extremely simple manner, and the range of the recording area for the nonvolatile mark can be optionally set.

Now, a magneto-optical medium in which a nonvolatile mark is formed in a different method from that described in the first embodiment will be described. In one method, a medium identification code is recorded in the magneto-optical disk, without applying an external magnetic field, by position-recording an 8T signal having been code modulated with (2,7)RLL at a recording density of 0.78 μm/mark under conditions of a peripheral velocity of 1.0 m/sec. and a writing light beam power (Pw) of 15.9 mW; and in another method, a medium identification code is recorded in the magneto-optical disk, with applying an external magnetic field in the recording direction, by position-recording an 8T signal having been code modulated with (2,7)RLL at a recording density of 0.78 μm/mark under conditions of a peripheral velocity of 1.0 m/sec. and a writing light beam power (Pw) of 15.9 mW by the recording method described by the Applicant in Japanese Patent Application No. 6-223278 (1994).

Figure 12:
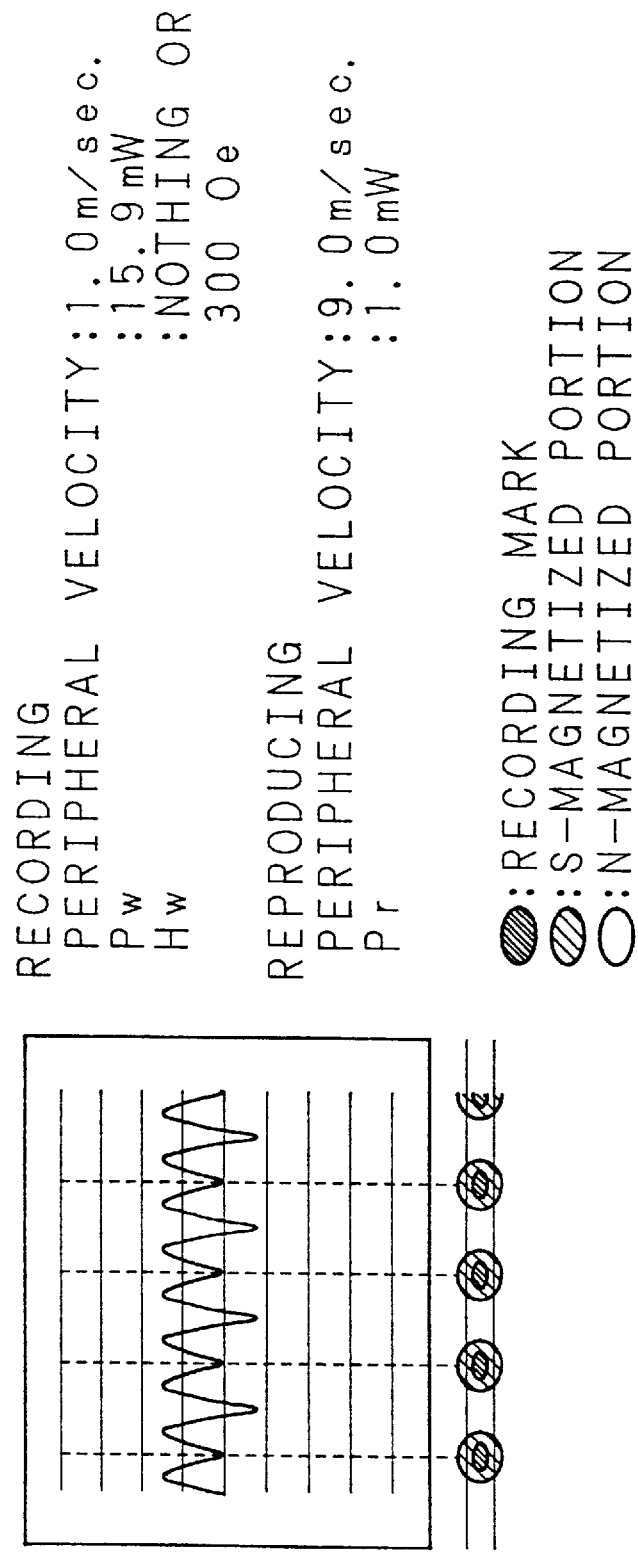
FIG. 12 is a diagram showing a reproducing waveform of a nonvolatile mark in the magneto-optical disk of the second embodiment.

When these identification codes are reproduced at a peripheral velocity of 9.0 m/sec. and a reading light beam power (Pr) of 1.0 mW, the same result is obtained. FIG. 12 shows a reproducing waveform obtained from these nonvolatile marks together with the recording track pattern. On the erased recording track is formed an area where the magnetization direction is reversed (a coarsely hatched area; i.e., an S magnetized portion), and an area (a finely hatched area; i.e., a nonvolatile mark) where the magnetization characteristic has been changed (specifically, the vertical anisotropy has been lost, so as to eliminate the Kerr effect) is formed in a high temperature area at substantially the center of the reversed magnetization area. Therefore, the reproducing waveform is shown as a pattern wherein a character "M" is repeated. When an erasing operation is conducted on the magneto-optical disk, in which the nonvolatile mark has been formed in this manner, at a peripheral velocity of 9.0 m/sec. with an erasing light beam power (Pe) of 10.5 mW and a magnetic field in the erasing direction of −300 Oe, a reproducing waveform similar to that shown in FIG. 4 is obtained.

A recording/reproducing program similar to that described in the second embodiment is recorded in a magneto-optical disk including a medium identification code recorded by forming a nonvolatile mark where the magnetization characteristic of the recording film is changed in the above-described manner. When a data is to be recorded in or reproduced from this magneto-optical disk, the portion around the nonvolatile mark where the magnetization is reversed is erased by conducting an erasing operation on the medium identification code. Thus, the nonvolatile mark similar to that of the first embodiment can be reproduced. As a result, the same effect as that of the second embodiment can be attained, so as to prevent illegal copy of a magneto-optical disk and protect a program and a data recorded therein.

Although the recording/reproducing program is recorded in the disk by forming a general rewritable recording mark in the aforementioned embodiments, the same effect can be attained by a read-only recording/reproducing program recorded by forming irregular pits. When the recording/reproducing program is recorded as a read-only program, the magneto-optical disk can be advantageously mass-produced at a low cost, and when the program is recorded as a rewritable program, it is possible to modify and add a data to the program.

Furthermore, it is possible to record an encoded data as a read-only data by forming irregular pits and reproduce the encoded data by using the medium identification code ID and a permission data separately supplied. As a third embodiment of the invention, a specific example of a magneto-optical medium including a medium identification code recorded as a nonvolatile mark and an encoded data recorded as an unrewritable read-only recording mark will be described.

Figure 13:
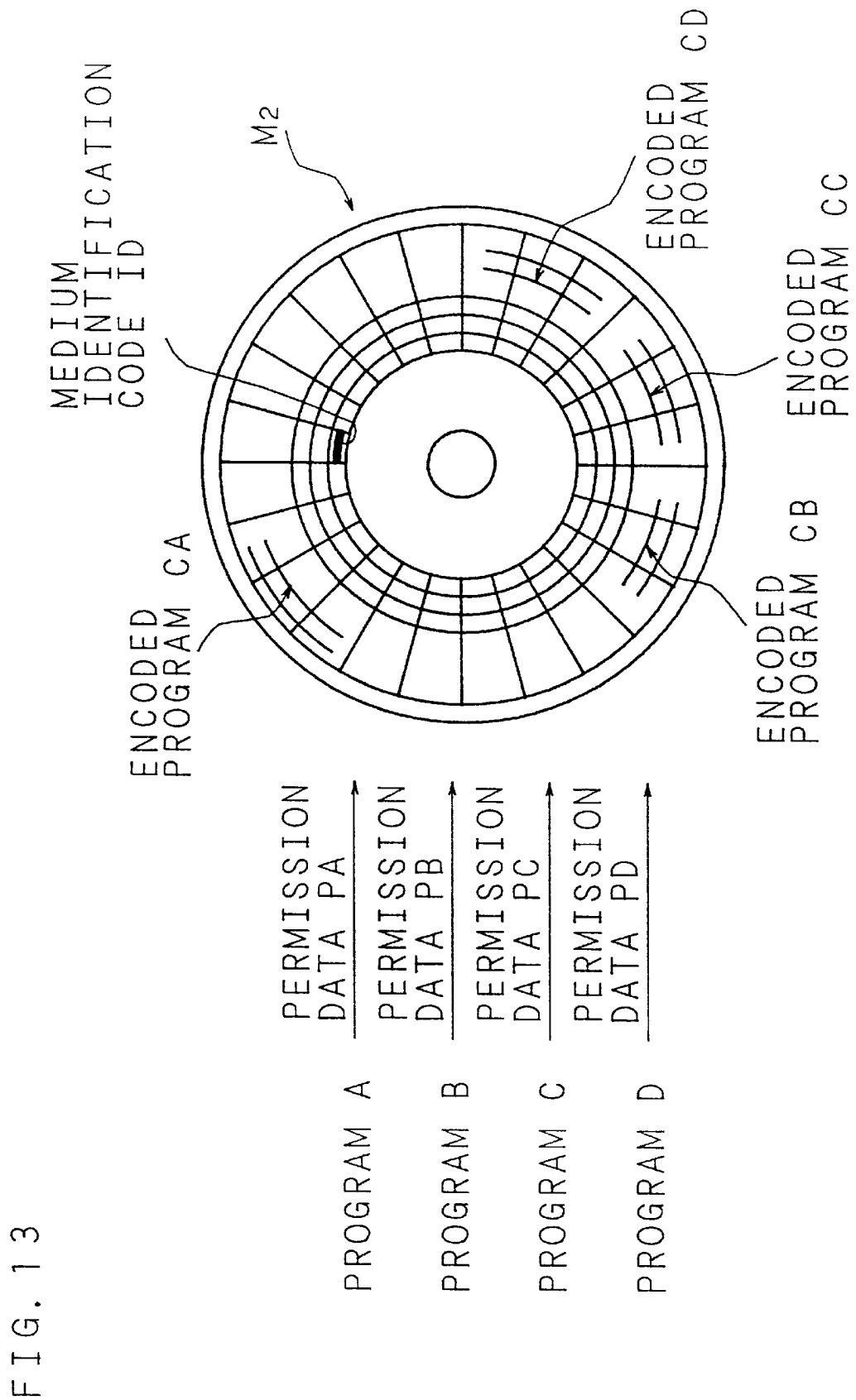
FIG. 13 is a schematic plane view showing the configuration of a magneto-optical disk of a third embodiment of the invention.

FIG. 13 is a schematic plane view showing the configuration of a magneto-optical medium according to the third embodiment. A medium identification code ID is recorded in a magneto-optical disk $M_2$ as a nonvolatile mark in the same manner as described in the first embodiment. Also in the magneto-optical disk $M_2$ are recorded an encoded program CA which is obtained by encoding a program A by using a permission data PA, an encoded program CB which is obtained by encoding a program B by using a permission data PB, an encoded program CC which is obtained by encoding a program C by using a permission data PC and an encoded program CD which is obtained by encoding a program D by using a permission data PD. The encoded programs CA, CB, CC and CD do not depend upon the medium identification ID but are fixed, and are recorded as irregular pits, and hence, such a magneto-optical disk can be mass-produced.

Figure 14:
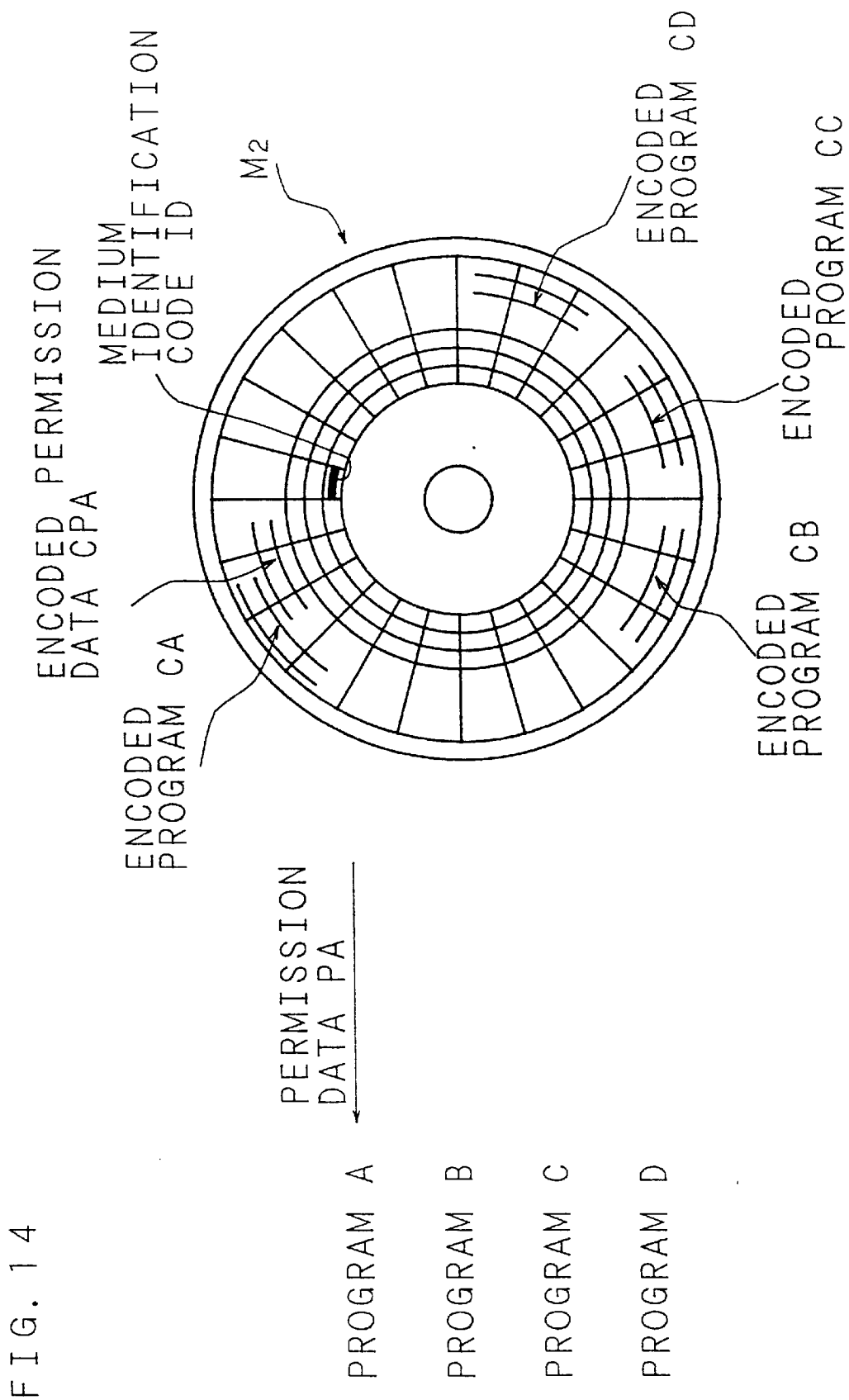
FIG. 14 is a schematic plane view showing another configuration of the magneto-optical disk of the third embodiment.

Since the programs are recorded in the encoded state in this magneto-optical disk $M_2$, the programs A, B, C and D cannot be directly used. When, for example, the program A is to be reproduced, it is necessary to obtain the permission data PA for decoding the encoded program CA. FIG. 14 is a schematic plane view showing the configuration of the magneto-optical disk $M_2$ in the case where the program A is to be reproduced. In the magneto-optical disk $M_2$ is recorded an encoded permission data CPA encoded by the medium identification code ID. When the program A is to be executed, the encoded permission data CPA is first decoded by using the medium identification code ID so as to obtain the permission data PA. Then, the encoded program CA is decoded by using the permission data PA so as to obtain the program A. By recording an encoded permission data corresponding to a desired program in the magneto-optical disk $M_2$ in this manner, the desired program can be executed.

The encoded permission data CPA which is obtained by encoding the permission data PA is recorded in order to prevent the encoded program CA and the encoded permission data CPA from being copied onto another medium, thereby preventing illegal usage of the program A. In order to obtain the permission data PA for decoding the encoded program CA, it is necessary to obtain both the encoded permission data CPA and the medium identification code ID.

This type of media including a plurality of programs similar to the magneto-optical disk $M_2$ are mass-produced at a low cost and an encoded permission data inherent to each program to be used for reproducing the program is additionally recorded in each of the media. Thus, a desired program can be used. Furthermore, since the encoded permission data CPA of the respective media are different from one another depending upon the medium identification codes ID inherent to the respective magneto-optical media, it is impossible to execute the program A even when an encoded permission data CPA of one magneto-optical medium is used for another magneto-optical medium. In this manner, a right to the program can be protected.

Furthermore, the programs A, B, C and D can be recorded as general rewritable recording marks. In this case, it is possible to add a data to and partially modify the programs. Therefore, data can be customized through addition and deletion depending upon a user.

When a medium identification code is recorded in a magneto-optical disk in order to prevent illegal copy, the medium identification code is accessed and erased more occasionally than a general data. Therefore, the medium identification code is required to have higher erase resistance than a general data. In the case of a nonvolatile mark formed by the present method, the amplitude of the reproducing signal is approximately a half of that of a general data, and hence, the erase resistance is likely to be lower than that of a general data. As a countermeasure against this, as will be described in the following fourth and fifth embodiments, a plurality of medium identification codes are recorded in one sector or in a plurality of sectors, so that the recorded medium identification codes are successively or randomly accessed.

Now, the fourth embodiment of the invention will be described. In a magneto-optical disk having a DyFeCo recording film, the same sixty four medium identification codes ID, each of 8 bytes, are recorded in one sector under conditions of a peripheral velocity of 1.0 m/sec., a writing light beam power (Pw) of 15.9 mW and an external magnetic field in the erasing direction of −300 Oe, as is shown in FIG. 9. Then, a reproducing operation is conducted under conditions of a peripheral velocity of 9.0 m/sec. and a reading light beam power (Pr) of 1.0 mW.

Figure 15:
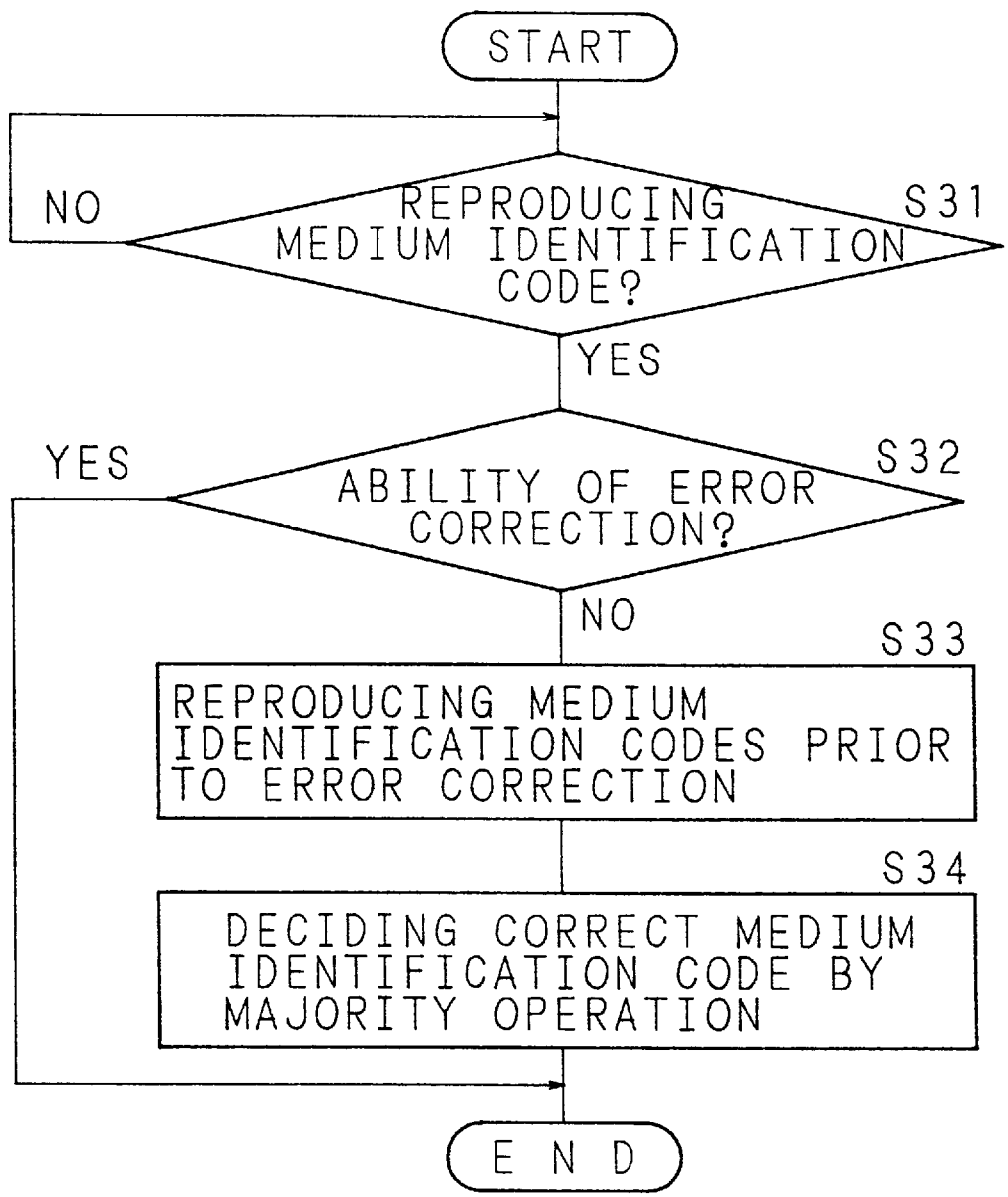
FIG. 15 is a flow chart for showing the reproducing procedures for a medium identification code in a magneto-optical disk of a fourth embodiment of the invention.

FIG. 15 is a flow chart showing the reproducing procedures for the medium identification codes ID. When the medium identification code ID is to be reproduced (step S31), an error correction is generally conducted. In the case of this magneto-optical disk, the medium identification code ID is correctly reproduced. The magneto-optical disk is allowed to stand in a desiccator filled with smoke of an incense stick, so as to reduce the reflectance by 30%. When a reproducing operation is conducted on the resultant magneto-optical disk, the medium identification code cannot be reproduced because error correction cannot be performed (step S32). From this a magneto-optical disk, the sixty four medium identification codes prior to the error correction are reproduced (step S33), and these medium identification codes are divided into data each of 8 bytes, so as to perform a majority operation. As a result, a correct medium identification code can be obtained (step S34). Specifically, even when the signal amplitude is decreased due to the degradation of the reflectance or reproducing power, it is possible to reproduce medium identification codes prior to the error correction, so as to obtain a correct medium identification code through a majority operation. In this embodiment, sixty four medium identification codes are recorded in one sector, but the number of the medium identification codes is not limited to sixty four. In addition, when the plural medium identification codes are recorded in a plurality of continuous or discontinuous sectors, the same effect can be attained.

Figure 16:
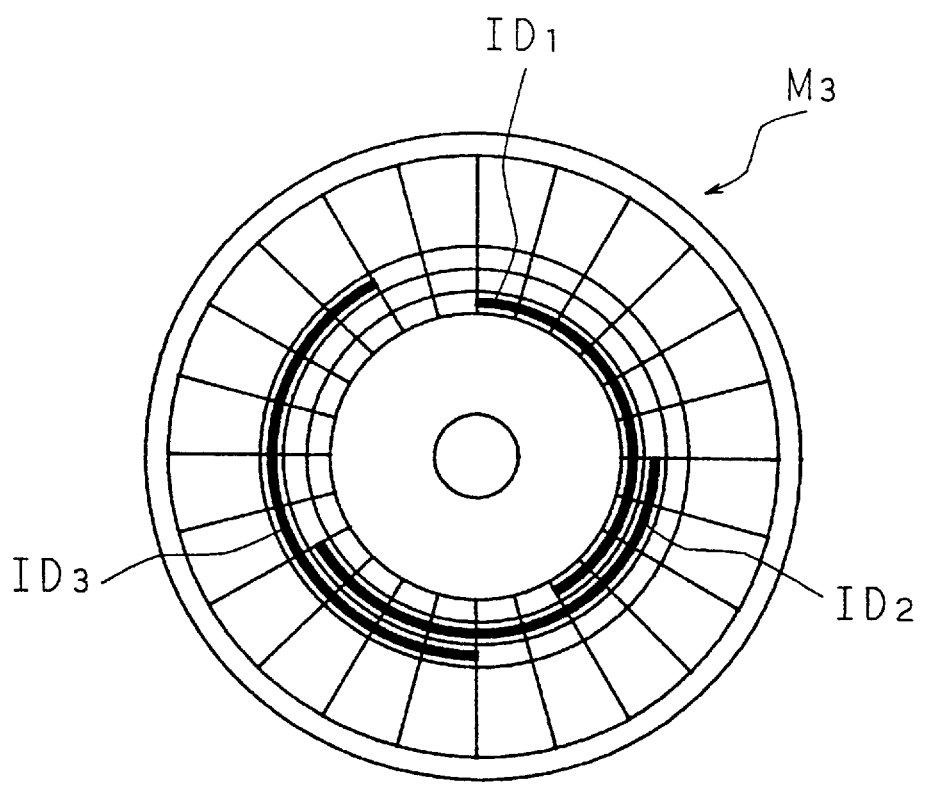
FIG. 16 is a schematic plane view showing the configuration of a magneto-optical disk of a fifth embodiment of the invention.
Figure 17:
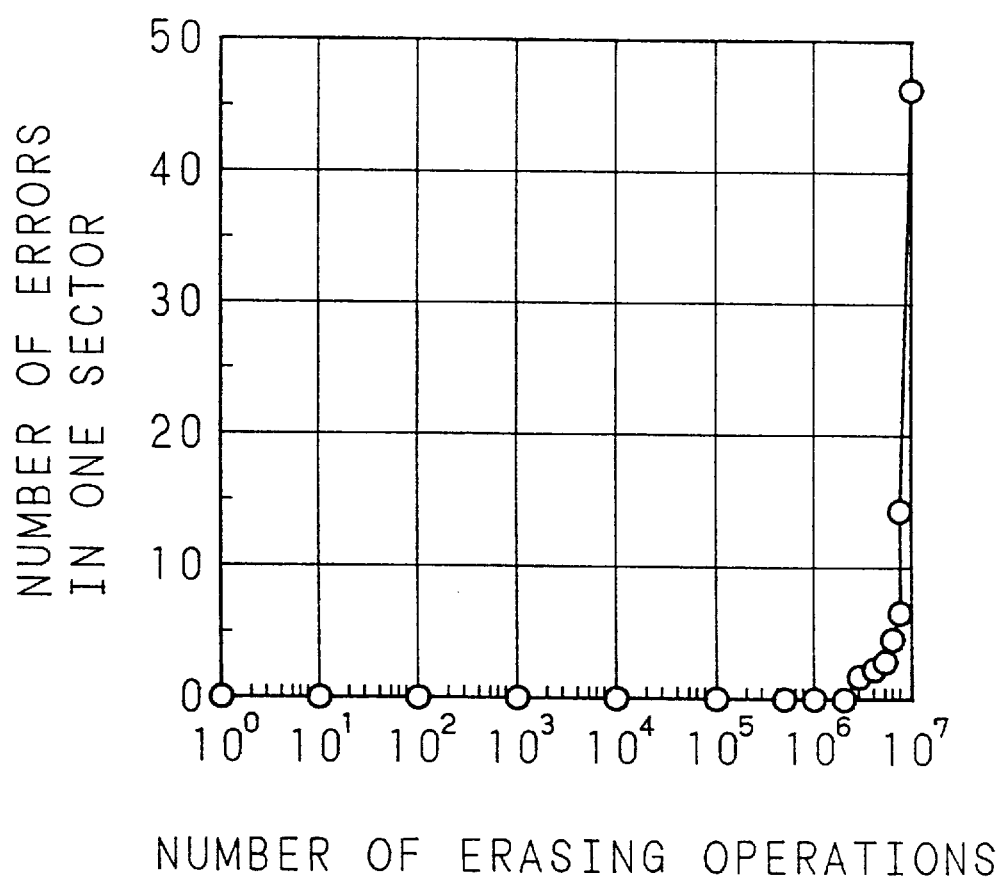
FIG. 17 is a graph showing the relationship between the number of erasing operations and the number of errors in the magneto-optical disk of the fifth embodiment.

The fifth embodiment of the invention will now be described. FIG. 16 is a schematic plane view showing the configuration of a magneto-optical medium of this embodiment. In a magneto-optical disk $M_3$ having a DyFeCo recording film, medium identification codes $ID_1$, $ID_2$ and $ID_3$ are recorded in three groups of continuous ten sectors respectively located in tracks with radius positions of 25 mm, 30 mm and 35 mm, under conditions of a peripheral velocity of 1.0 m/sec., a writing light beam power (Pw) of 15.9 mW and an external magnetic field in the erasing direction of −300 Oe. The medium identification code $ID_1$, which is recorded in the track with the radius position of 25 mm of the magneto-optical disk $M_3$, is repeatedly erased with an erasing light beam power of 10.5 mW, and then reproduced in the same manner as in the fourth embodiment. FIG. 17 is a graph showing the relationship between the number of the erasing operations and the number of errors in each of the ten sectors. In this graph, the ordinate indicates the number of errors in one sector, and the abscissa indicates the number of the erasing operations. As is understood from this graph, the number of errors is not increased up to the number of the erasing operations of $10^6$, but when the number of the erasing operations exceeds $10^6$, the number of errors starts to increase, and the number of errors abruptly increases when the number of the erasing operations exceeds $10^7$. When the number of the erasing operations exceeds $10^7$, the errors cannot be corrected. However, when the medium identification codes $ID_2$ and $ID_3$ recorded in the tracks with the radius positions of 30 mm and 35 mm are reproduced after this, it is found that the number of errors is small, and that the medium identification codes $ID_2$ and $ID_3$ can be successfully reproduced. In this manner, when a plurality of recorded medium identification codes are randomly reproduced, the number of errors on the respective medium identification codes can be decreased. Furthermore, when a medium identification code at a random position is reproduced in each operation, sectors including the medium identification codes are prevented from being identified.

Figure 18:
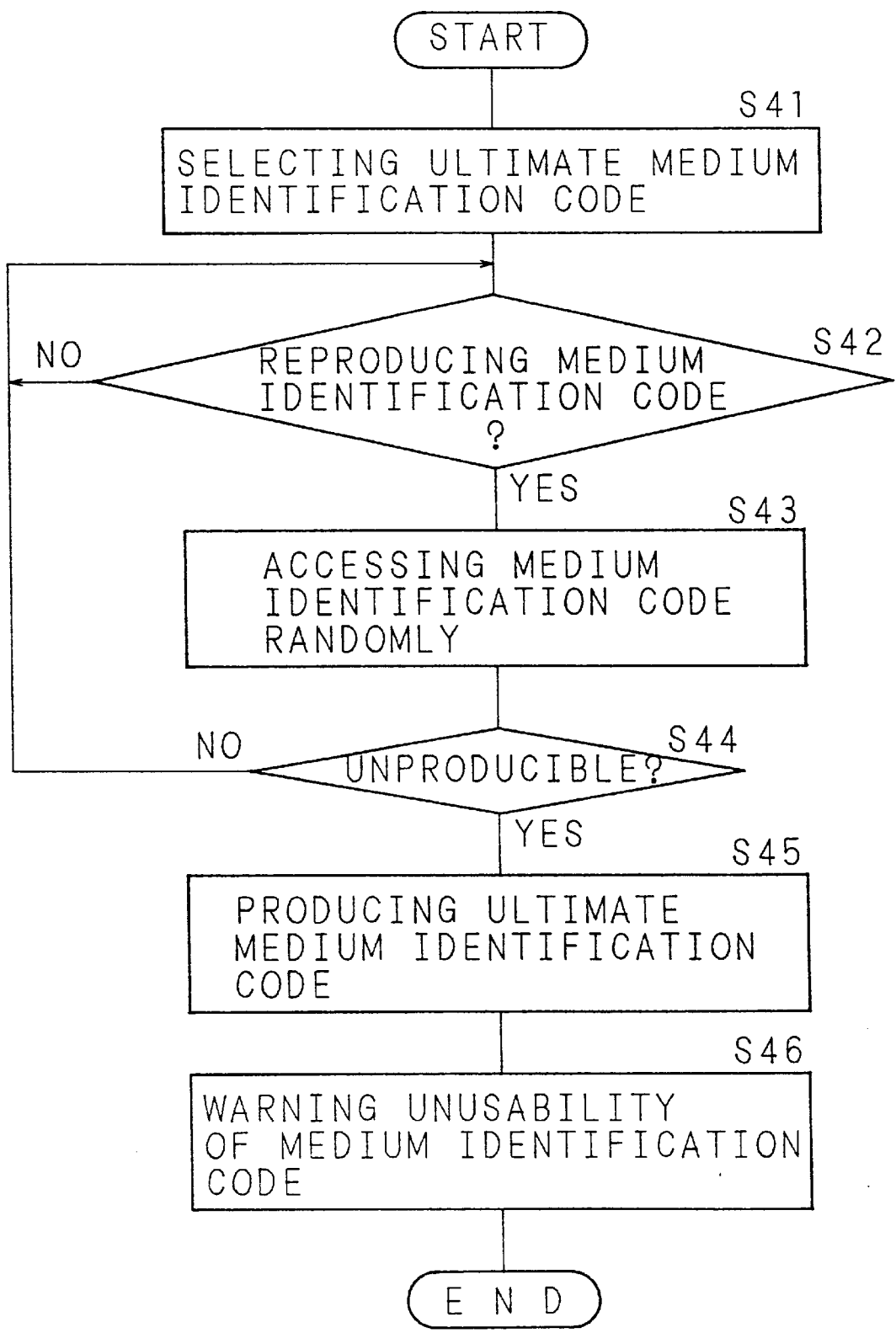
FIG. 18 is a flow chart for showing the reproducing procedures for a medium identification code in the magneto-optical disk of the fifth embodiment.

Now, a reproducing method for preventing a magneto-optical medium from becoming unusable due to exhaustion of a medium identification code will be described. FIG. 18 is a flow chart for showing the reproducing procedures for a medium identification code. First, at least one of a plurality of medium identification codes is selected as an ultimate medium identification code which is retained without being accessed and erased (step S41). When a medium identification code is to be reproduced (step S42), one of the other medium identification codes excluding the ultimate medium identification code is randomly accessed (step S43). When all the other medium identification codes become unreproducible (step S44), the ultimate medium identification code is reproduced (step S45), and a warning is provided so as to inform that the medium identification code will become unusable in a short period of time (step S46). When this reproducing method is adopted, the medium identification codes can be additionally recorded or duplicated by a manufacturer while the ultimate medium identification code is still usable. As a result, a recorded data in the magneto-optical disk can be prevented from becoming unreproducible.

Figure 19:
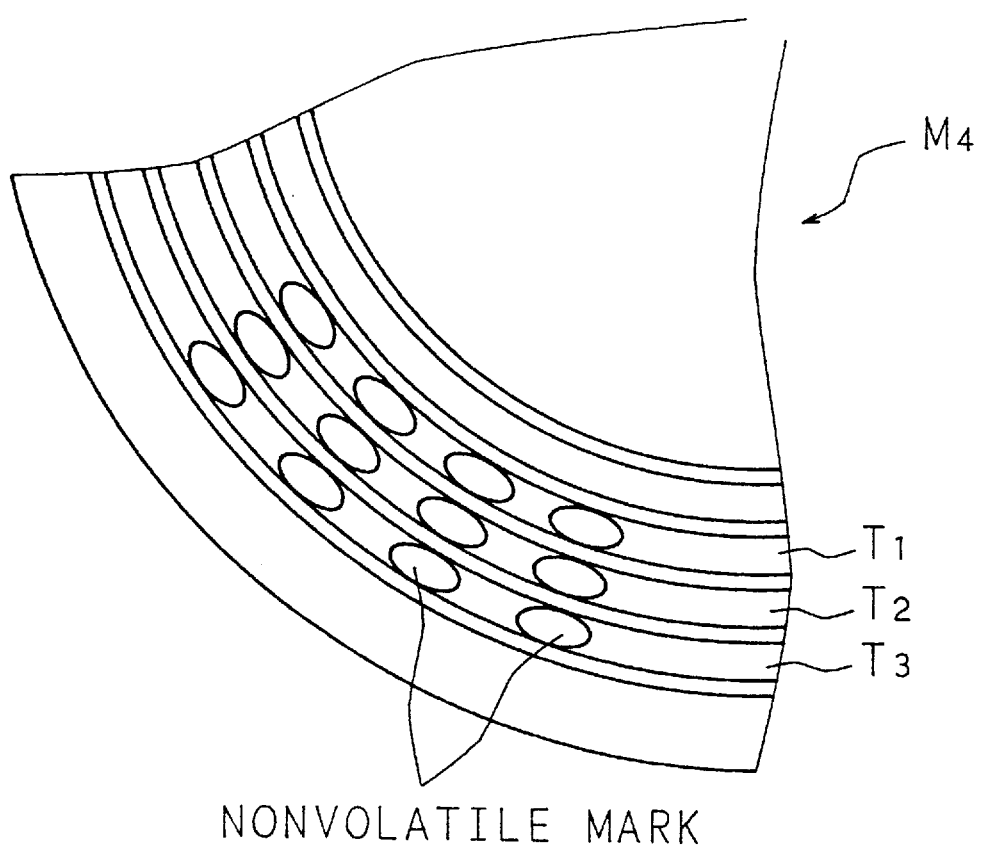
FIG. 19 is a schematic plane view showing the configuration of a magneto-optical disk of a sixth embodiment of the invention.

A sixth embodiment of the invention will now be described referring to FIG. 19, which is a schematic partial plane view showing the configuration of a magneto-optical disk of this embodiment. A magneto-optical disk $M_4$ comprises a polycarbonate substrate on which track areas T are formed with each track area being sandwiched between groove areas G, a SiN protection film, a DyFeCo amorphous alloy recording film, another SiN protection film, an Al reflecting film and a resin coating layer laminated in this order on the substrate. In three adjacent track areas $T_1$, $T_2$ and $T_3$ of this magneto-optical disk $M_4$, medium identification codes are position-recorded at a recording density of 0.78 $\mu$m/mark under conditions of a peripheral velocity of 1.0 m/sec., a writing light beam power (Pw) of 15.9 mW and an external magnetic field in the erasing direction of −300 Oe. At this point, one medium identification code is recorded in the track areas $T_1$, $T_2$ and $T_3$ at corresponding positions in the radial direction. When the medium identification code is to be reproduced from the magneto-optical disk $M_4$, a reproducing operation is conducted by irradiating the center track area $T_2$ under conditions of a peripheral velocity of 9.0 m/sec. and a reading light beam power (Pr) of 1.0 mW. Thus, higher C/N can be obtained as compared with the case where the medium identification code is recorded merely in one track.

Figure 20:
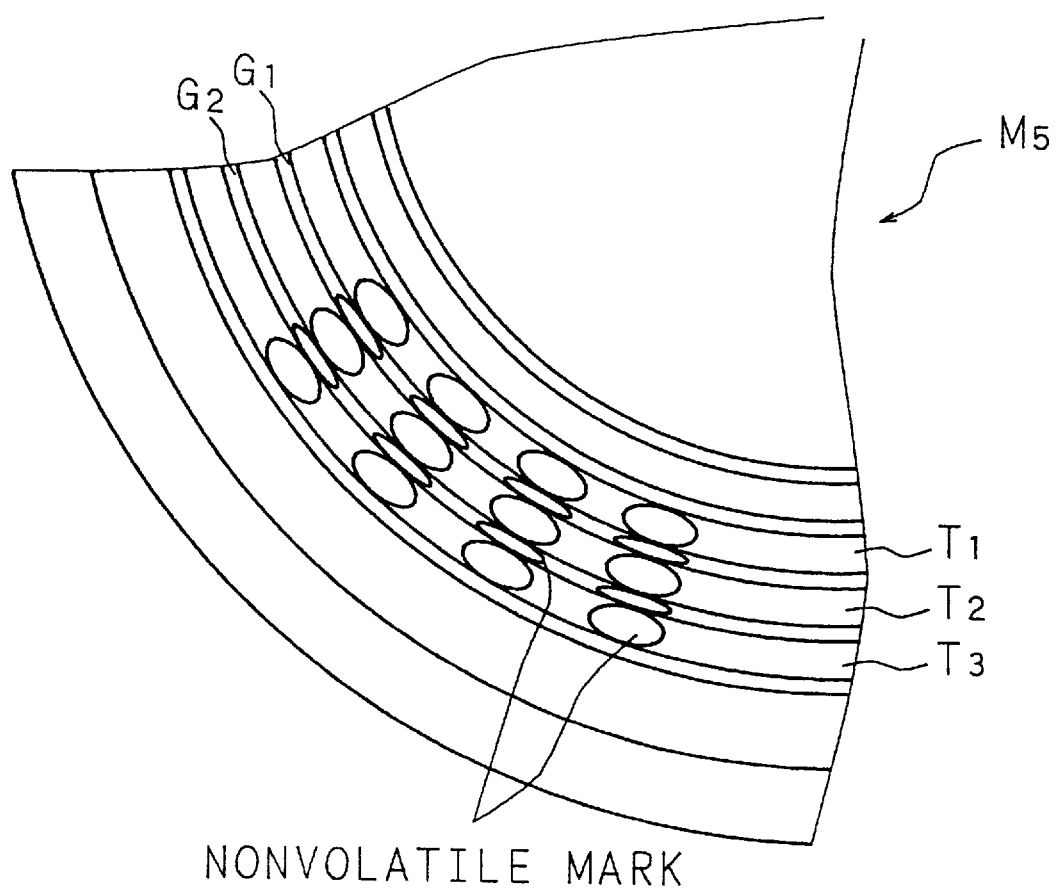
FIG. 20 is a schematic plane view showing the configuration of a magneto-optical disk of a seventh embodiment of the invention.

FIG. 20 is a schematic partial plane view showing the configuration of a magneto-optical disk according to a seventh embodiment. In the magneto-optical disk $M_5$, medium identification codes are recorded in three adjacent track areas $T_1$, $T_2$ and $T_3$ and groove areas $G_1$ and $G_2$ sandwiched between these track areas. At this point, one medium identification code is recorded in the track areas $T_1$, $T_2$ and $T_3$ and the groove areas $G_1$ and $G_2$ at corresponding positions in the radial direction. The recording conditions for the medium identification code and the remaining configuration of the magneto-optical disk are similar to those of the sixth embodiment, and hence the description is omitted.

When the medium identification code is to be reproduced from the magneto-optical disk $M_5$, a reproducing operation is conducted by irradiating the center track area $T_2$ between the groove areas $G_1$ and $G_2$ with a reading light beam power (Pr) of 1.0 mW. In this case, the obtained C/N is 44 dB, which is higher than 41 dB, that is, the C/N obtained when the medium identification code is recorded in merely one track. Thus, the C/N obtained in a reproducing operation is found to be increased by forming the same nonvolatile marks in corresponding portions of the adjacent track areas.

Now, a phase-change type optical medium according to an eighth embodiment of the invention will be described. A phase-change type optical disk comprises a recording film whose phase state (crystallinity) is changed through irradiation of a light beam. In a recording operation, the phase state is changed in accordance with a data to be recorded, so as to form a recording mark. In a reproducing operation, the change of a reflectance in accordance with the phase state is detected, so as to reproduce a recorded data. In some of such phase-change type optical disks, the phase state of the recording film can be changed between crystal and amorphous, so as to reversibly form a recording mark. For this purpose, the recording film is crystallized by heating it up to a temperature exceeding a predetermined temperature inherent to the material for the recording film, and the recording film is changed into amorphous by heating it up to a higher predetermined temperature or more in a recording operation. In a reproducing operation, the recording film is irradiated with a reproducing light beam, and the change of reflectance of the reflected light is allowed to correspond to 0 or 1, so as to reproduce a recorded data. In an erasing operation, the recording film is crystallized by heating it to a temperature at which the recording film can be crystallized with ease.

Figure 21:
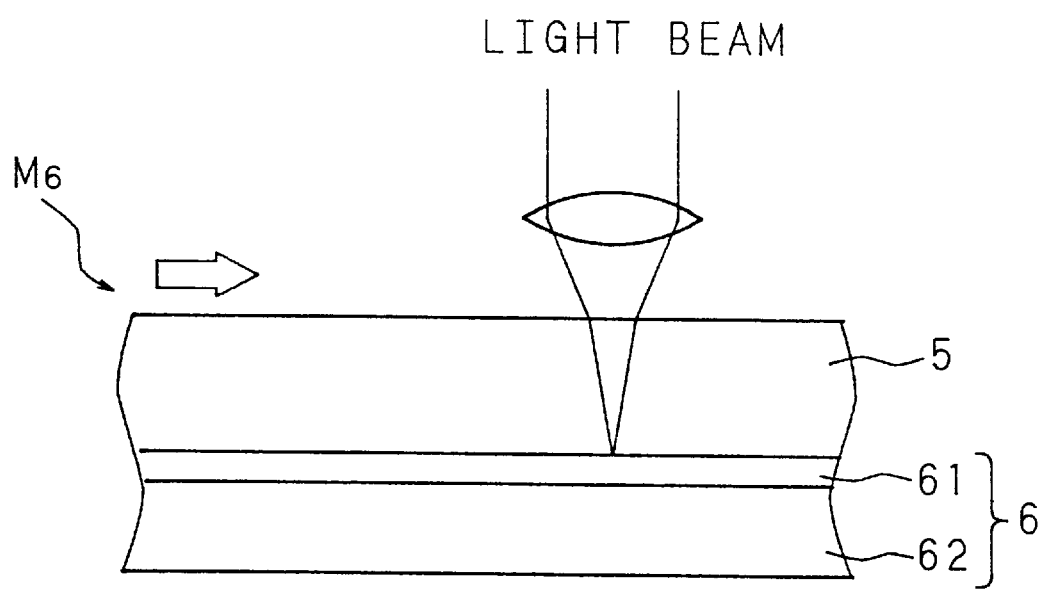
FIG. 21 is an explanatory diagram showing a recording a operation for a nonvolatile mark in an optical disk of an eighth embodiment of the invention.

FIG. 21 is an explanatory diagram showing light beam irradiation for recording a nonvolatile mark in a phase-change type optical disk $M_6$ according to the eighth embodiment. The optical disk $M_6$ in which a recording mark can be reversibly formed as mentioned above comprises a polycarbonate substrate 5 with a thickness of 1.2 mm and an outer diameter of 86 mm, a recording film 6 and a protection film (not shown) laminated on the substrate 5. On the substrate 5 are formed pre-grooves with a track pitch of 1.4 μm, and a header signal is recorded thereon by the form of a pit. The recording film 6 comprises a ZnS film 61 (with a thickness of 10 nm) and an InSb film 62 (with a thickness of 80 nm). The ZnS film 61 is formed on the substrate 5 by vapor evaporation, and the InSb film 62 is formed on the ZnS film 61. After recording a nonvolatile mark as described later, the protection film (with a thickness of 10 μm) is coated over the InSb film 62.

The optical disk $M_6$ has the same configuration as that of the magneto-optical disk shown in FIG. 9 except for the materials for the recording film 6. In an area $S_1$ is recorded a medium identification code ID by using a nonvolatile mark as will be described below, and in areas $S_2$ and $S_3$ are recorded a recording/reproducing program for recording a data in and reproducing a data from the medium and other encoded data as general recording marks.

Now, a method for recording a medium identification code in the optical disk $M_6$ will be described. First, the InSb film 62 is subjected to a crystallization treatment. The crystallization treatment is a treatment for changing the phase state of the recording film 6 from amorphous to crystal, and is conducted by rotating the optical disk $M_6$ at a linear velocity of 9 m/sec. and irradiating respective tracks with a light beam of 5 mW. Then, a nonvolatile mark is recorded in the area $S_1$ under conditions of a linear velocity of 2 m/sec. and writing light beam power of 12 mW, thereby recording a medium identification code ID. When the recording area is observed with a microscope, the recording film 6 is deformed so as to have a hole. In this case, as the medium identification code ID, a 2/7 modulated signal obtained by repeating FFh by 512 bytes is used.

Figure 22:
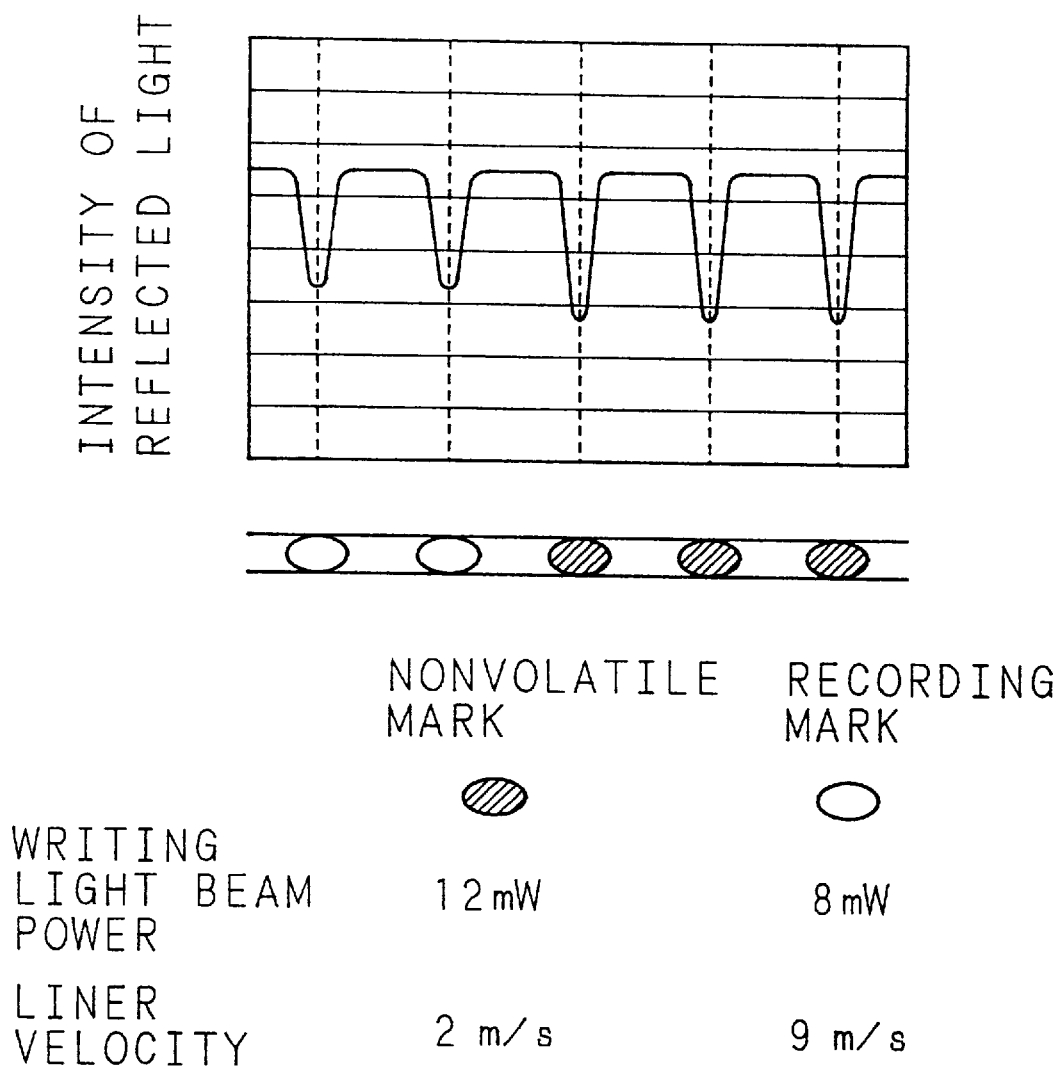
FIG. 22 is a graph showing the intensity of reflected light in the optical disk of the eighth embodiment.

FIG. 22 is a graph showing the intensity of reflected reproducing light in the optical disk of this embodiment obtained as follows: In a recording film formed in the same manner as in the optical disk $M_6$, a nonvolatile mark is formed under the aforementioned recording conditions and a rewritable recording mark is formed under general recording conditions. The intensity of reflected light obtained in reproducing this optical disk is measured. The general recording conditions are a linear velocity of 9 m/sec. and a writing light beam power of 8 mW. As is understood from this graph, the intensity of reflected light in the nonvolatile mark is slightly higher than that in the general recording mark.

Figure 23:
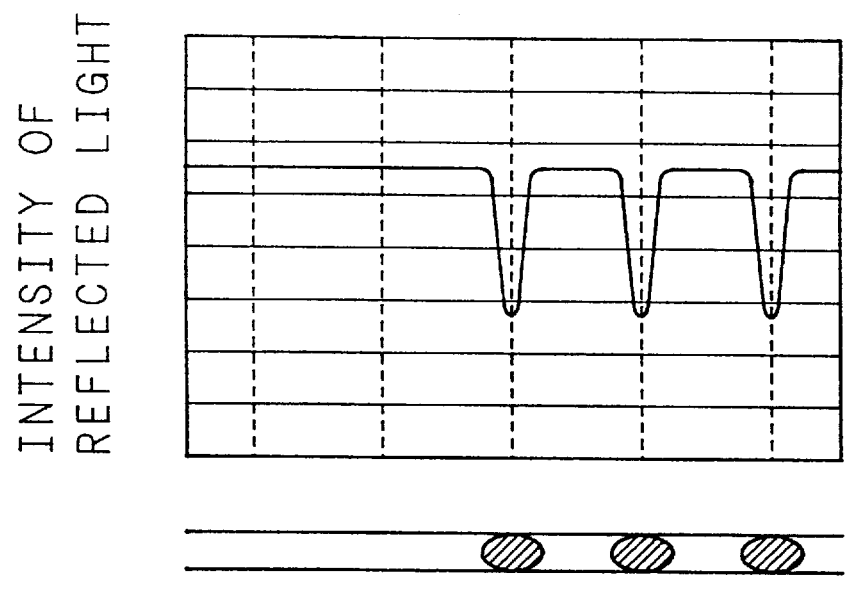
FIG. 23 is another graph showing the intensity of reflected light in the optical disk of the eighth embodiment.

Next, an erasing operation is conducted on the areas where nonvolatile mark and the recording mark are formed. FIG. 23 is a graph showing the intensity of reflected light obtained by reproducing the optical disk after the erasing operation. The erasing conditions are a linear velocity of 9 m/sec. and an erasing light beam power of 5 mW. As is understood from the graph, the general recording mark is erased through the erasing operation, but the nonvolatile mark is not erased. In this manner, an irreversible recording operation can be conducted by irradiating with a stronger light beam and/or rotating the optical disk at a lower velocity than in the general recording operation. The medium identification code ID is recorded by forming such a nonvolatile mark (in the area $S_1$).

The recording/reproducing operation for such an optical disk $M_6$ can be performed in the same manner as in the second embodiment (shown in FIGS. 10 and 11), and hence the description is omitted. For example, when the optical disk $M_6$ is copied onto another phase-change type disk, the medium identification code ID and the encoded data are copied thereon. However, these data are recorded as the general recording marks of the phase-change recording method. Therefore, the medium identification code ID is erased through the erasing operation for the medium identification code ID in a reproducing operation, and cannot be reproduced. As a result, even when the encoded data is copied, the medium identification code ID which is necessary for decoding the data cannot be reproduced, thereby protecting the data.

Also in the case where the optical disk $M_6$ is copied onto another magneto-optical disk, the same effect can be attained. The copied medium identification code ID and encoded data are recorded as the recording marks of the general magneto-optical recording method. Therefore, the medium identification code ID is erased through an erasing operation for the medium identification code ID in a reproducing operation, and hence, the encoded data cannot be decoded.

In the above-mentioned optical disk $M_6$, the recording/reproducing program and the encoded data are recorded as the general recording marks. However, the recording method for these data is not limited to this but these data can be recorded as irregular pits.

Figure 24:
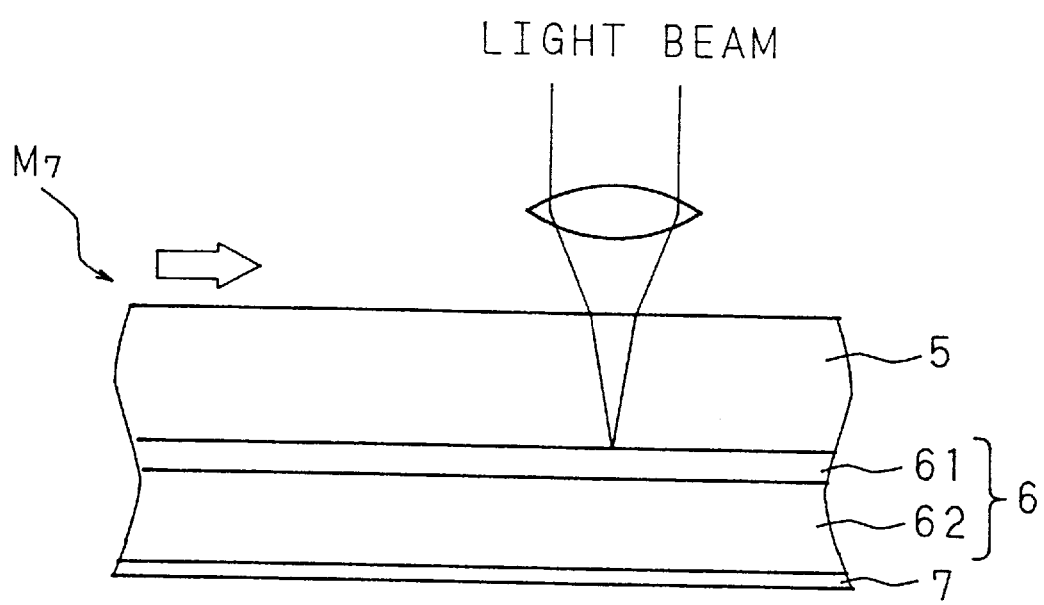
FIG. 24 is an explanatory diagram showing the film configuration of an optical disk of a ninth embodiment of the invention and a recording operation for a nonvolatile mark in the optical disk.

Now, a ninth embodiment of the invention will be described. FIG. 24 is an explanatory diagram showing the formation of a nonvolatile mark in a phase-change type optical disk $M_7$ according to this embodiment. The optical disk $M_7$ comprises a polycarbonate substrate 5 with a thickness of 1.2 mm and an outer diameter of 86 mm, and a recording film 6 and a protection film 7 laminated on the substrate 5. On the substrate 5 are formed pre-grooves with a track pitch of 1.4 $\mu$m, and a head signal is recorded thereon by the form of a pit. The recording film 6 comprises a ZnS film 61 (with a thickness of 10 nm) and an InSb film 62 (with a thickness of 80 nm). The ZnS film 61 is formed on the substrate 5 by vapor evaporation, and the InSb film 62 is formed on the ZnS film 61. The protection film 7 of a UV polymerizable resin (with a thickness of 10 $\mu$m) is coated over the InSb film 62.

The optical disk $M_7$ has the same configuration as that of the magneto-optical disk shown in FIG. 16 except for the materials for the recording film 6. Medium identification codes $ID_1$, $ID_2$ and $ID_3$ are recorded at different radius positions on the disk. The medium identification codes $ID_1$, $ID_2$ and $ID_3$ are recorded under conditions of a linear velocity of 1 m/sec. and a writing light beam power of 15 mW. When the recording areas are observed with a microscope, the substrate 5, the recording film 6 and the protection film 7 are all deformed so that the protection film 7 has a recess. In this case, as the medium identification code ID, a 2/7 modulated signal obtained by repeating FFh by 512 bytes is used.

Figure 25:
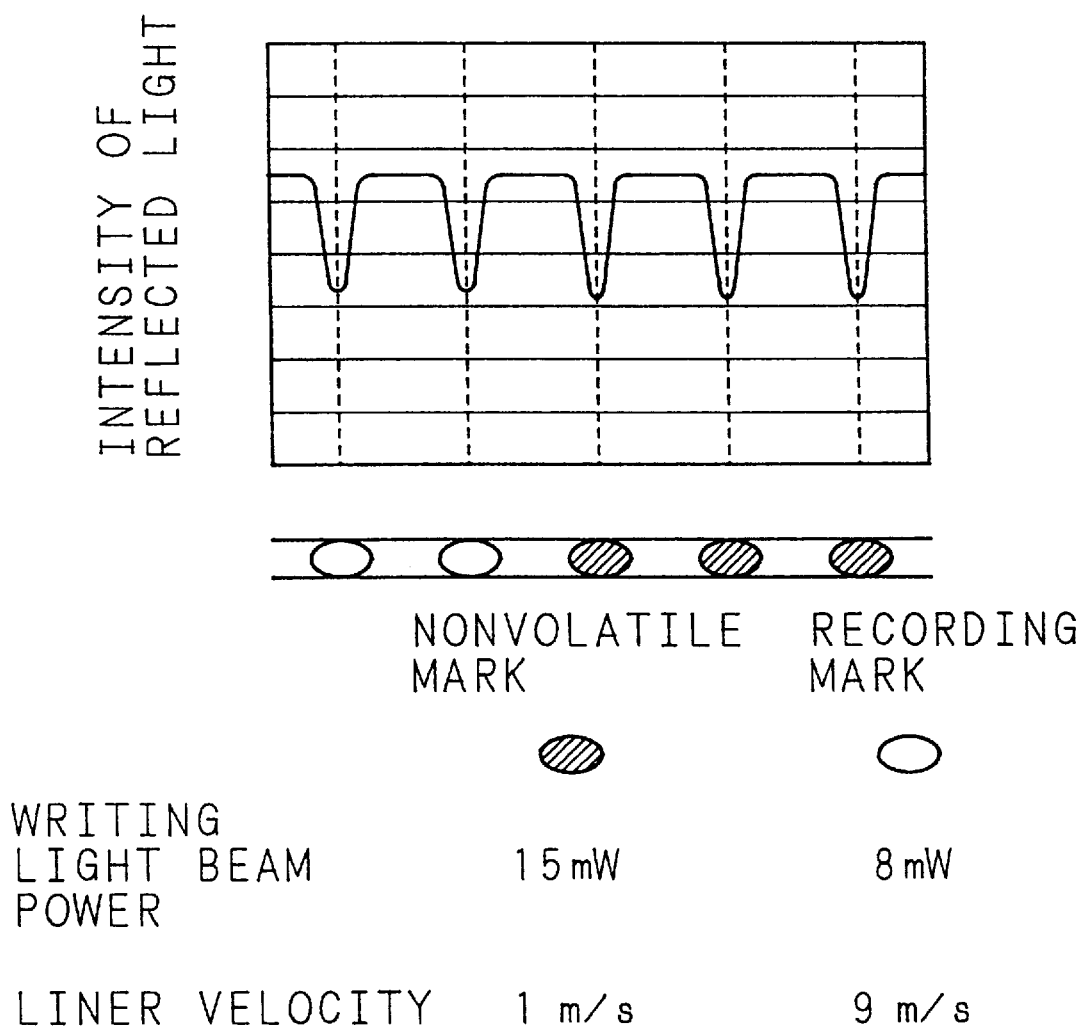
FIG. 25 is a graph showing the intensity of reflected light in the optical disk of the ninth embodiment.

FIG. 25 is a graph showing the intensity of reflected reproducing light in the optical disk of this embodiment obtained as follows: In a recording film formed in the same manner as in the optical disk $M_7$, a nonvolatile mark is formed under the aforementioned recording conditions and a rewritable recording mark is formed under general recording conditions. The intensity of reflected light obtained in reproducing this optical disk is measured. The general recording conditions are a linear velocity of 9 m/sec. and a writing light beam power of 8 mW. As is understood from this graph, the intensity of reflected light in the nonvolatile mark is substantially the same as that in the general recording mark.

Figure 26:
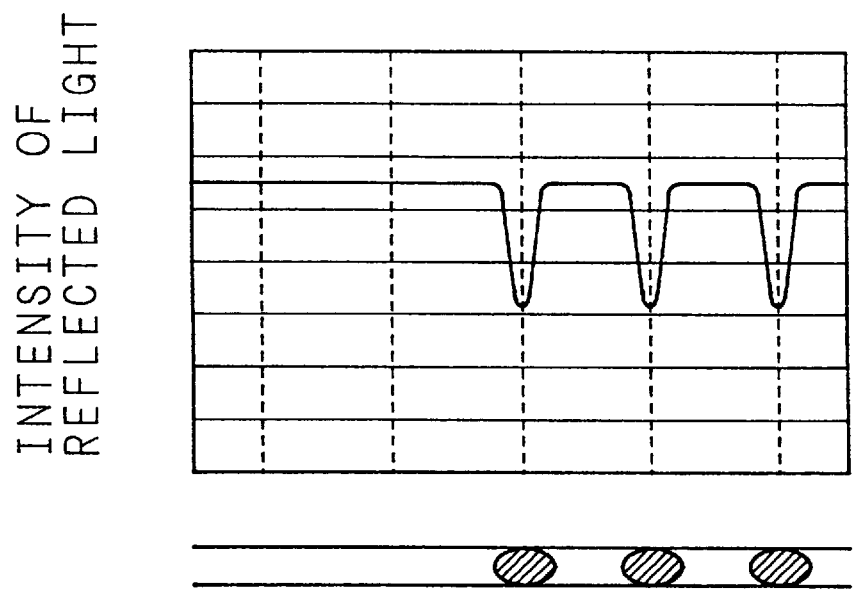
FIG. 26 is another graph showing the intensity of reflected light in the optical disk of the ninth embodiment.

Next, an erasing operation is conducted on the areas where the nonvolatile mark and the general recording mark are formed. FIG. 26 is a graph showing the intensity of reflected light obtained by reproducing the optical disk after the erasing operation. The erasing conditions are a linear velocity of 9 m/sec. and an erasing light beam power of 5 mW. As is obvious from the graph, the general recording mark is erased through the erasing operation, but the nonvolatile mark is not erased. Thus, a nonvolatile mark can be formed under the aforementioned recording conditions.

By randomly reproducing a plurality of medium identification codes recorded at a plurality of positions on such an optical disk $M_7$, the number of errors on the respective medium identification codes can be decreased. In addition, when the recording areas for the medium identification codes are randomly accessed in each reproducing operation, sectors including the medium identification codes are prevented from being identified.

Furthermore, in order to prevent the optical disk $M_7$ from becoming unusable due to exhaustion of the medium identification codes thereon, at least one medium identification code is selected as a code not to be accessed as is shown in FIG. 18, and the other medium identification codes excluding this code are reproduced.

Although InSb is used for the recording films 6 included in the optical disks of the eighth and ninth embodiments, the material for the recording film 6 is not limited to InSb but can be any material whose phase can be reversibly changed between crystal and amorphous and can be irreversibly changed under the aforementioned recording conditions. In addition, the irreversible change is not limited to the formation of a hole and the deformation of the recording film, but, for example, a change caused by a segregation phenomenon of the material for the recording film can attain the same effect.

In the aforementioned embodiments, the described magneto-optical media have a disk-shape, but the shape of the medium is not limited to this. For example, a card-shaped magneto-optical medium or phase-change type optical disk can attain the same effect.

As described above, according to the present invention, a nonvolatile mark is formed by changing the magnetization characteristic of a recording film, namely, the magnetic Kerr effect has been lost and the change of the polarizing angle is substantially zero in the nonvolatile mark. Therefore, the present optical recording medium has a write-once type nonvolatile recording function as well as a general magneto-optical recording function.

Furthermore, since there is no need to separately provide a recording layer for a write-once operation in the present optical recording medium, a write-once type nonvolatile recording operation as well as a magneto-optical recording operation can be conducted by using a general optical medium.

Additionally, in the present optical medium, a nonvolatile mark is formed merely by changing a peripheral velocity of the medium and a writing light beam power. Therefore, the recording/reproducing procedures for the present optical recording medium are identical to the general magneto-optical recording/reproducing procedures or the phase-change type recording/reproducing procedures. Therefore, a nonvolatile mark can be recorded and reproduced easily with a general apparatus, and the range of a recording area for the nonvolatile mark can be optionally set.

Furthermore, since the nonvolatile mark is used for recording a medium identification code inherent to each medium, illegal copy of the medium can be prevented, so as to protect data recorded in the medium.

As this invention may be embodied in several forms without departing from the spirit of essential characteristics thereof; the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical recording medium, comprising:
    a substrate;
    a recording film formed on the substrate having plural tracks for storing user data and further having a track gap interposed between each of said plural tracks, and a medium identification code recorded on the recording film as a nonvolatile mark formed by irreversibly changing a portion of the recording film.

2. The optical recording medium according to claim 1, wherein said medium identification code is recorded in each of plural portions of said recording film.

3. The optical recording medium according to claim 1, wherein one medium identification code is formed in each of an odd number of adjacent said track areas.

4. The optical recording medium according to claim 1, wherein one medium identification code is recorded in one said track area and each of two said groove areas sandwiching said track area.

5. An optical recording medium, comprising:

a substrate;

a recording film formed on the substrate, for recording data;

wherein on the recording film-are recorded:

a medium identification code recorded as a nonvolatile mark formed by irreversibly changing a portion of the recording film; and a recording program for encoding data based on the reproduced medium identification code.

6. An optical recording medium, comprising:

a substrate; and a recording film formed on the substrate, for recording data;

wherein on the recording film are recorded:

a medium identification code as a nonvolatile mark formed by irreversibly changing a portion of the recording film; and a reproducing program for decoding reproduced data based on said medium identification code.

7. The optical recording medium according to claim 1 wherein said medium identification code is unique for each recording medium.

8. The optical recording medium according to claim 6 wherein said medium identification code is unique for each recording medium.

* * * * *

UNITED STATES PATENT AND TRADEMARK OFFICE
CERTIFICATE OF CORRECTION

PATENT NO. : 5,812,501
DATED : September 22, 1998
INVENTOR(S) : Moribe et al.

It is certified that error appears in the above-identified patent and that said Letters Patent is hereby corrected as shown below:

On the title page:

Under "[56] References Cited" delete "Oshiima" and insert --Oshima-- therefor

Column 4, line 45, delete "10"

Column 7, line 5, after "steps of" delete "is"

Column 11, line 24, after "film in the" delete "In"

Column 12, line 26, delete "$S_1$" and insert --S11-- therefor

UNITED STATES PATENT AND TRADEMARK OFFICE
CERTIFICATE OF CORRECTION

PATENT NO. : 5,812,501
DATED : September 22, 1998
INVENTOR(S) : Moribe et al.

It is certified that error appears in the above-identified patent and that said Letters Patent is hereby corrected as shown below:

Column 18, line 35, before "nonvolatile" insert

--the--

Column 21, line 18, delete "film-are" and insert --film are-- therefor

Signed and Sealed this

Tenth Day of August, 1999

Attest:

Q. TODD DICKINSON

*Attesting Officer*  Acting Commissioner of Patents and Trademarks